US009521745B2

(12) United States Patent
Fujimura et al.

(10) Patent No.: US 9,521,745 B2
(45) Date of Patent: Dec. 13, 2016

(54) SUSPENSION BOARD WITH CIRCUIT AND PRODUCING METHOD THEREOF

(71) Applicant: NITTO DENKO CORPORATION, Osaka (JP)

(72) Inventors: Yoshito Fujimura, Osaka (JP); Saori Kanezaki, Osaka (JP); Naohiro Terada, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/054,391

(22) Filed: Feb. 26, 2016

(65) Prior Publication Data

US 2016/0270216 A1    Sep. 15, 2016

(30) Foreign Application Priority Data

Mar. 10, 2015    (JP) ................................ 2015-047356

(51) Int. Cl.

| G11B 5/48 | (2006.01) |
|---|---|
| H05K 1/02 | (2006.01) |
| H05K 1/11 | (2006.01) |
| H05K 3/00 | (2006.01) |
| H05K 3/10 | (2006.01) |
| H05K 3/40 | (2006.01) |
| H05K 3/46 | (2006.01) |
| H05K 1/05 | (2006.01) |

(52) U.S. Cl.
CPC ........... H05K 1/0271 (2013.01); G11B 5/4846 (2013.01); H05K 1/0298 (2013.01); H05K 1/05 (2013.01); H05K 1/115 (2013.01); H05K 3/0017 (2013.01); H05K 3/10 (2013.01); H05K 3/4038 (2013.01); H05K 3/4644 (2013.01)

(58) Field of Classification Search
CPC ................................ G11B 5/48; G11B 5/4846
USPC ............................................... 360/245–245.9
See application file for complete search history.

(56) References Cited

U.S. PATENT DOCUMENTS

| 6,399,899 | B1 | 6/2002 | Ohkawa et al. | |
|---|---|---|---|---|
| 2001/0009491 | A1* | 7/2001 | Sasaki .................... | B82Y 10/00 360/318 |
| 2007/0017695 | A1* | 1/2007 | Ishii ........................ | H05K 3/38 174/255 |

FOREIGN PATENT DOCUMENTS

JP        2001-209918 A        8/2001

* cited by examiner

*Primary Examiner* — Allen T Cao
(74) *Attorney, Agent, or Firm* — Jean C. Edwards, Esq.; Edwards Neils LLC

(57) ABSTRACT

A suspension board with circuit includes a metal supporting board having a support opening portion, a base insulating layer disposed at one side of the metal supporting board, and a conductive layer disposed at one side of the base insulating layer and including a plurality of terminal portions overlapped with the support opening portion and disposed at spaced intervals to each other. The base insulating layer includes a plurality of base opening portions that are disposed between the plurality of terminal portions in an arrangement direction, a plurality of thick portions that are overlapped with each of end portions of the plurality of terminal portions in a direction orthogonal to both directions of the thickness direction and the arrangement direction, and a plurality of thin portions that are disposed along edge portions of the plurality of base opening portions between the plurality of thick portions and are thinner than the plurality of thick portions.

6 Claims, 13 Drawing Sheets

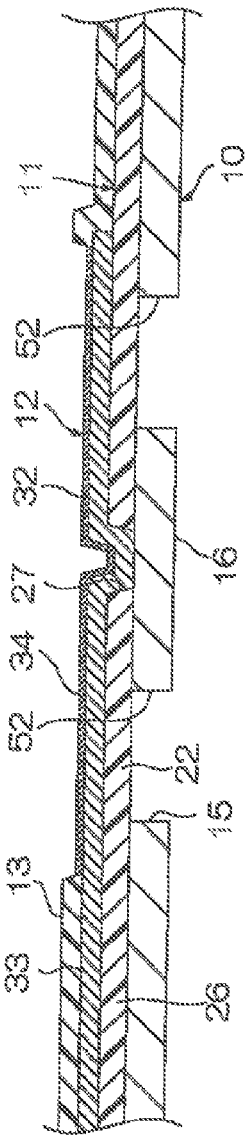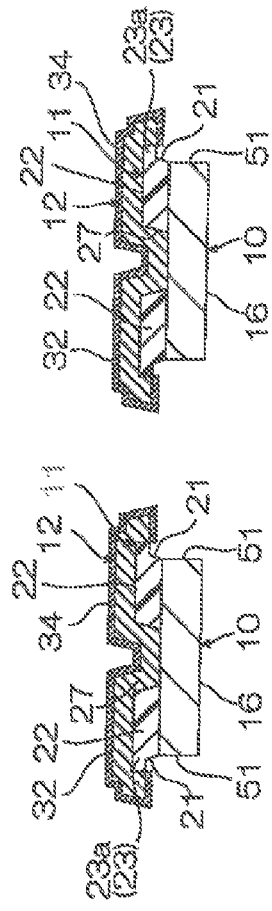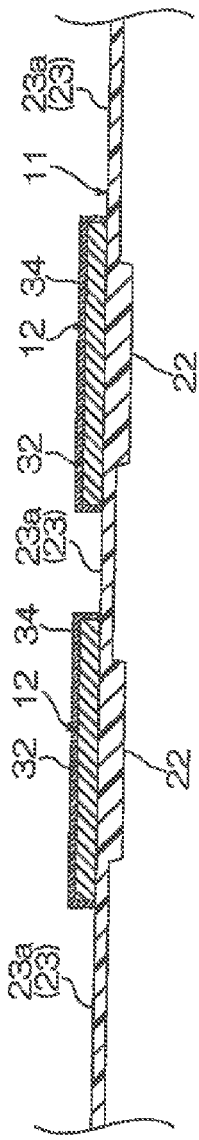

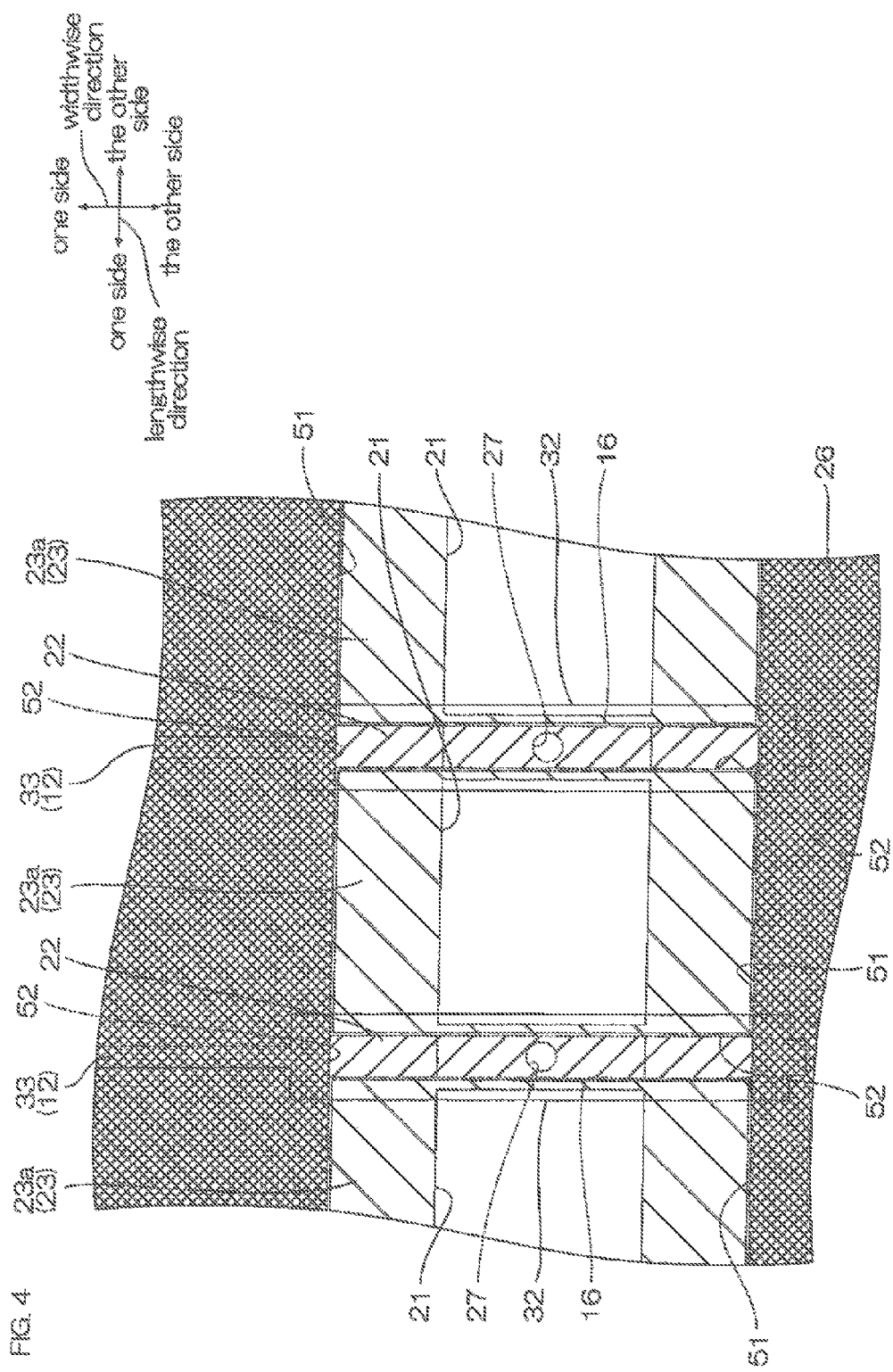

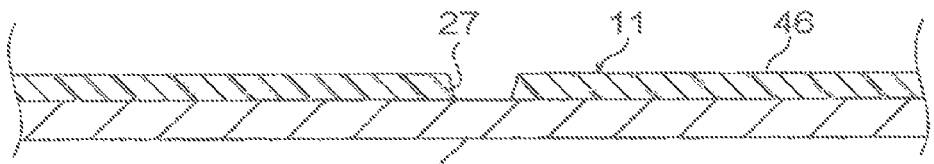
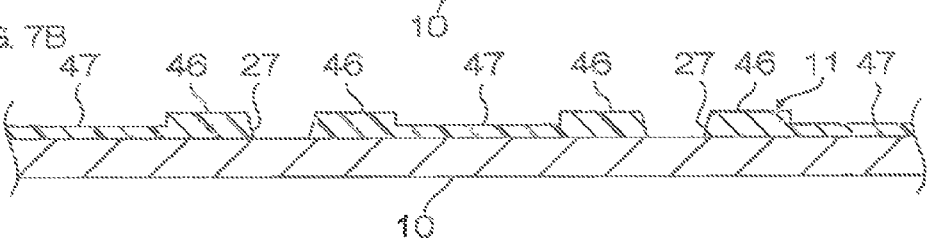
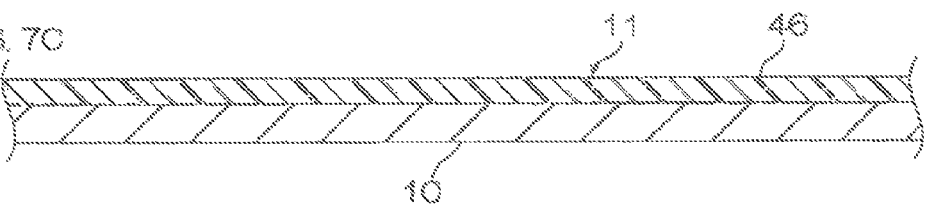
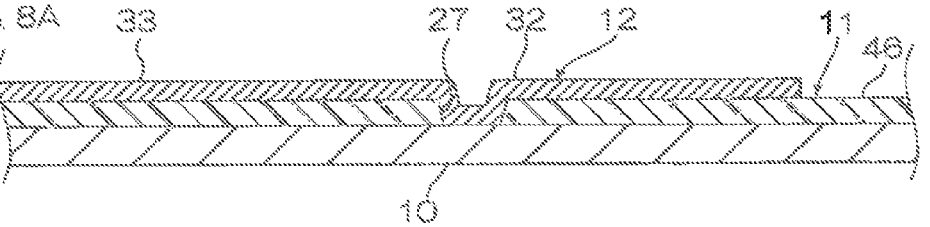
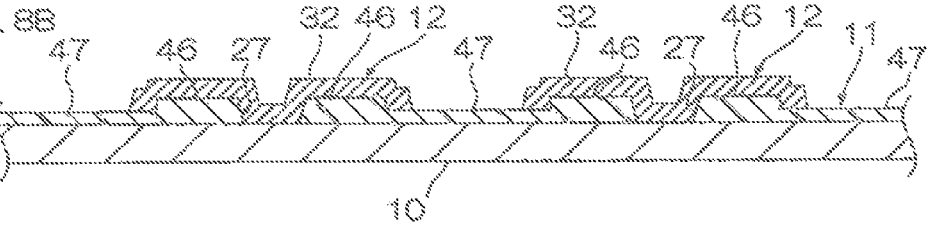
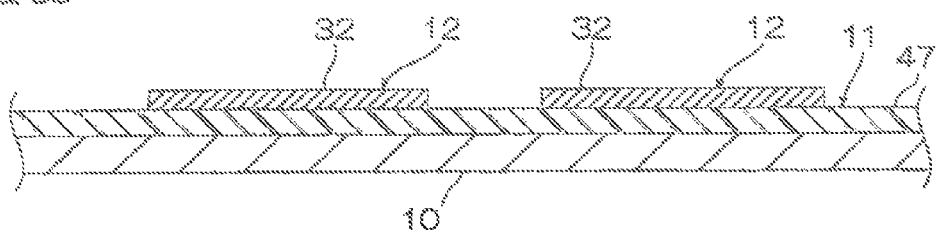

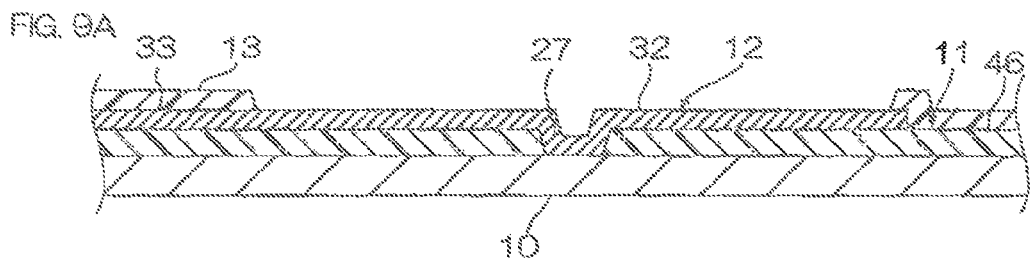
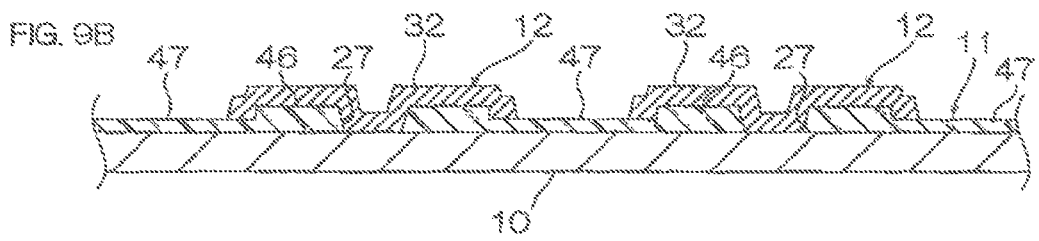
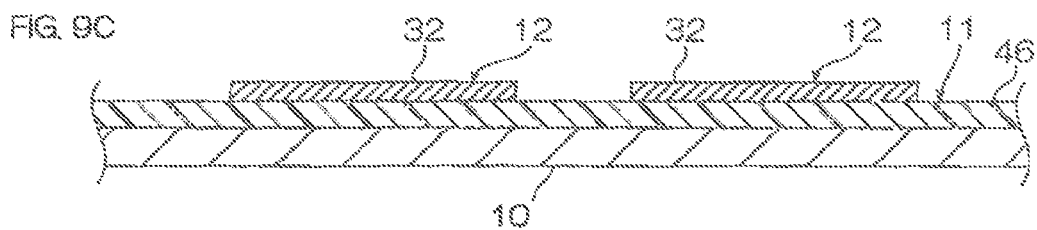
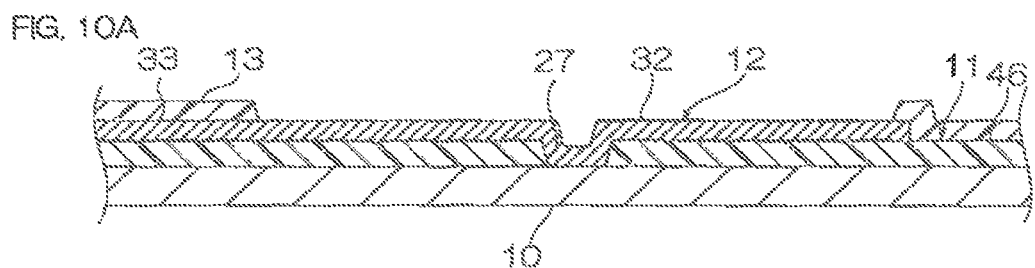
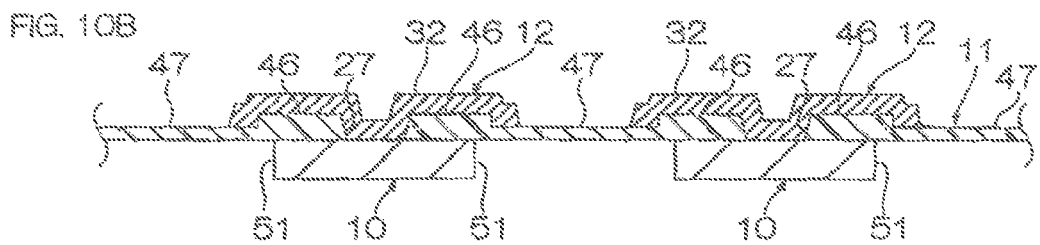
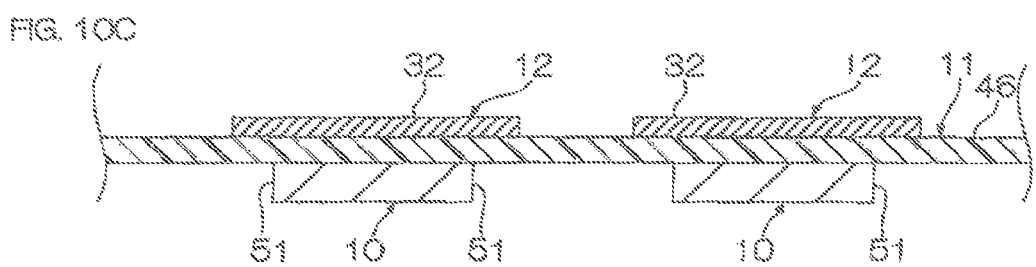

SUSPENSION BOARD WITH CIRCUIT AND PRODUCING METHOD THEREOF

CROSS-REFERENCE TO RELATED APPLICATION

The present application claims priority from Japanese Patent Application No. 2015-047356 filed on Mar. 10, 2015, the contents of which are hereby incorporated by reference into this application,

BACKGROUND OF THE INVENTION

Field of the Invention

The present invention relates to a suspension board with circuit and a producing method thereof, to be specific, to a suspension board with circuit used in a hard disk drive and a producing method thereof.

Description of Related Art

As a suspension board with circuit, a suspension board with circuit including a supporting board, a base layer formed on the supporting board, a conductive layer formed on the base layer and including a connecting terminal, and a cover layer covering the conductive layer has been conventionally known.

As such a suspension board with circuit, a suspension board with circuit in which opening portions are formed in each of the supporting board and the base layer, and a plurality of connecting terminals are, when projected in a thickness direction, included in the opening portions is known (ref: for example, Japanese Unexamined Patent Publication No. 2001-209918). In the suspension board with circuit, the supporting board and the base layer are not formed in a region that is overlapped with the connecting terminals in the thickness direction, so that vibrations can be smoothly transmitted at the time of connecting the connecting terminals to terminals of an external read/write board by ultrasonic vibrations.

SUMMARY OF THE INVENTION

In the suspension board with circuit described in Japanese Unexamined Patent Publication No. 2001-209918, the thickness of the base layer is formed to be thick, the same, and rigid between one piece of connecting terminal and a connecting terminal that is adjacent to the one piece of connecting terminal. Thus, in a case where vibrations occur at the time of connecting the connecting terminal to the terminal of the external read/write board and a case where stress is applied to the connecting terminal after the connection thereof, the vibrations and the stress are easily applied to the connecting terminal that is adjacent to the connecting terminal via the base layer. Thus, there is a disadvantage that the connecting reliability of the connecting terminal is reduced.

On the other hand, stress easily concentrates in an end portion of the connecting terminal. Thus, a region where the end portion of the connecting terminal is disposed is better to have higher rigidity.

It is an object of the present invention to provide a suspension board with circuit that is capable of reinforcing each of end portions of a plurality of terminal portions and improving the connecting reliability of each of the plurality of terminal portions, and a producing method thereof.

A suspension board with circuit of the present invention includes a metal supporting board having a support opening portion passing through in a thickness direction, a base insulating layer disposed at one side in the thickness direction of the metal supporting board, and a conductive layer disposed at one side in the thickness direction of the base insulating layer and including a plurality of terminal portions, when projected in the thickness direction, overlapped with the support opening portion and disposed at spaced intervals to each other; wherein the base insulating layer includes a plurality of base opening portions that pass through in the thickness direction and are, when projected in the thickness direction, disposed between the plurality of terminal portions in an arrangement direction of the plurality of terminal portions, a plurality of thick portions that are, when projected in the thickness direction, overlapped with each of end portions of the plurality of terminal portions in a direction orthogonal to both directions of the thickness direction and the arrangement direction, and a plurality of thin portions that are disposed along edge portions of the plurality of base opening portions between the plurality of thick portions and are thinner than the plurality of thick portions.

According to the suspension board with circuit, each of the plurality of thick portions is, when projected in the thickness direction, overlapped with each of the end portions of the plurality of terminal portions in the direction orthogonal to the thickness and arrangement directions.

Thus, the rigidity of each of the end portions of the plurality of terminal portions in the direction orthogonal to the thickness and arrangement directions can be relatively increased by each of the plurality of thick portions.

As a result, each of the end portions of the plurality of terminal portions in the direction orthogonal to the thickness and arrangement directions can be reinforced.

Each of the plurality of base opening portions is, when projected in the thickness direction, disposed between the plurality of terminal portions in the arrangement direction. Each of the plurality of thin portions is disposed along each of the edge portions of the plurality of base opening portions.

Thus, each of the plurality of thin portions is disposed between the plurality of terminal portions in the arrangement direction.

As a result, the rigidity of the base insulating layer between the plurality of terminal portions can be relatively reduced.

Accordingly, when vibrations and stress occur in one piece of terminal portion, the vibrations and the stress can be reduced or absorbed by the thin portions and the transmission of the vibrations and the stress to the terminal portion that is adjacent to the one piece of terminal portion can be suppressed.

Therefore, the connection reliability of each of the plurality of terminal portions can be improved.

In the suspension board with circuit of the present invention it is preferable that the metal supporting board includes a terminal connecting portion that is disposed at the inside of the support opening portion so as to be separated from an edge portion of the support opening portion and is, when projected in the thickness direction, overlapped with each of the plurality of terminal portions; the base insulating layer includes an insulating portion that is disposed between the terminal connecting portion and the terminal portion in the thickness direction and a connecting opening portion that passes through the insulating portion in the thickness direction; and the terminal connecting portion is electrically connected to the terminal portion via the connecting opening portion.

According to the suspension board with circuit, when the terminal connecting portion is electrically connected from the other side in the thickness direction thereof, the terminal portion is electrically connected via the terminal connecting portion.

Thus, both sides in the thickness direction of the terminal portion can be electrically connected.

In the suspension board with circuit of the present invention, it is preferable that both sides in the thickness direction of each of the plurality of terminal portions, excluding a portion overlapped with the thick portion, are exposed, when projected in the thickness direction.

According to the suspension board with circuit, both sides in the thickness direction of the terminal portion can be electrically connected.

A method for producing a suspension board with circuit of the present invention includes the steps of preparing a metal supporting board; forming a base insulating layer including plurality of first portions disposed at spaced intervals to each other and having a thin thickness and a second portion disposed so as to surround the plurality of first portions and having a thicker thickness than the plurality of first portions at one side in a thickness direction of the metal supporting board; forming a conductive layer including a plurality of terminal portions, when projected in the thickness direction, overlapped with the second portion between the plurality of first portions in an arrangement direction of the plurality of first portions at one side in the thickness direction of the base insulating layer; by etching the metal supporting board, forming a plurality of first support opening portions passing through in the thickness direction and disposed, when projected in the thickness direction, so as to include each of the plurality of first portions; by etching the base insulating layer via the plurality of first support opening portions, removing the plurality of first portions to form a plurality of base opening portions passing through in the thickness direction and as a plurality of thin portions, forming a second portion exposed from the plurality of first support opening portions and, when projected in the thickness direction, being continuous to circumferential edge portions of the plurality of base opening portions; and after forming the plurality of thin portions, by etching the metal supporting board, forming, in the metal supporting board, a plurality of second support opening portions passing through in the thickness direction and, when projected in the thickness direction, overlapped with each of end portions of the plurality of terminal portions in a direction orthogonal to at least both directions of the thickness direction and the arrangement direction and as a plurality of thick portions, forming, in the base insulating layer, a second portion, when projected in the thickness direction, overlapped with the plurality of second support opening portions.

According to the method for producing a suspension board with circuit, in the step of forming the first support opening portions by etching the metal supporting board, the first support opening portion is not formed in a portion that is, when projected in the thickness direction, overlapped with each of the end portions of the plurality of terminal portions in the direction orthogonal to the thickness and arrangement directions in the metal supporting board. After the step of etching the base insulating layer, the plurality of second support opening portions are formed in this portion, so that the second portion that is overlapped with the plurality of second support opening portions in the base insulating layer is formed as the plurality of thick portions that are not etched. Each of the plurality of thick portions is, when projected in the thickness direction, overlapped with each of the end portions of the plurality of terminal portions in the direction orthogonal to the thickness and arrangement directions.

Thus, the rigidity of each of the end portions of the plurality of terminal portions in the direction orthogonal to the thickness and arrangement directions can be relatively increased by each of the plurality of thick portions.

As a result, each of the end portions of the plurality of terminal portions in the direction orthogonal to the thickness and arrangement directions can be reinforced.

Each of the plurality of base opening portions is, when projected in the thickness direction, disposed between the plurality of terminal portions in the arrangement direction. Each of the plurality of thin portions is disposed along each of the edge portions of the plurality of base opening portions.

Thus, each of the plurality of thin portions is disposed between the plurality of terminal portions in the arrangement direction.

As a result, the rigidity of the base insulating layer between the plurality of terminal portions can be relatively reduced.

Accordingly when vibrations and stress occur in one piece of terminal portion, the vibrations and the stress can be reduced or absorbed by the thin portions and the transmission of the vibrations and the stress to the terminal portion that is adjacent to the one piece of terminal portion can be suppressed.

Therefore, the connection reliability of each of the plurality of terminal portions can be improved.

In the method for producing a suspension board with circuit of the present invention, it is preferable that the step of forming the base insulating layer includes a step of forming a connecting opening portion that passes through in the thickness direction and is disposed in the second portion between the plurality of first portions hi the arrangement direction; the step of forming the conductive layer includes a step of electrically connecting the metal supporting board to the terminal portion via the connecting opening portion; and the step of forming the plurality of second support opening portions by etching the metal supporting board includes a step of forming a plurality of second support opening portions so as to leave a portion that is, when projected in the thickness direction, overlapped with each of the central portions of the plurality of terminal portions in the metal supporting board and forming the portion that is overlapped with each of the central portions of the plurality of terminal portions as a terminal connecting portion.

According to the method for producing a suspension board with circuit, when the terminal connecting portion is electrically connected from the other side in the thickness direction thereof, the terminal portion is electrically connected via the terminal connecting portion.

Thus, both sides in the thickness direction of the terminal portion can be electrically connected.

In the method for producing a suspension board with circuit of the present invention, it is preferable that the step of forming the base insulating layer includes a step of forming a plurality of third portions that are disposed between the plurality of first portions in the arrangement direction and have the same thickness as that of the plurality of first portions; the step of forming the plurality of first support opening portions by etching the metal supporting board further includes a step of forming, in the metal supporting board, a plurality of third support opening portions that pass through in the thickness direction and are disposed, when projected in the thickness direction, so as to be overlapped with the plurality of third portions; and the step of etching the base insulating layer includes a step of removing the third portion that is exposed from the plurality of third support opening portions and is, when projected in the thickness direction, overlapped with the plurality of third support opening portions.

According to the method for producing a suspension board with circuit, both sides in the thickness direction of each of the plurality of terminal portions are exposed.

Thus, both sides in the thickness direction of the terminal portion can be electrically connected.

BRIEF DESCRIPTION OF THE DRAWINGS

FIG. 3A shows a sectional view along an A-A line of the suspension board with circuit shown in FIG. 2.

FIG. 3B shows, a sectional view along a B-B line in FIG. 2.

FIG. 3C shows a sectional view along a C-C line in FIG. 2.

FIG. 4 shows an enlarged plan view of first base opening portions, thick portions, and thin portions of a base insulating layer of the suspension board with circuit shown in FIG. 2.

FIG. 5A illustrating a sectional view corresponding to FIG. 3A,

FIG. 5B illustrating a sectional view corresponding to FIG. 3B, and

FIG. 5C illustrating a sectional view corresponding to FIG. 3C.

FIG. 6A illustrating a sectional view corresponding to FIG. 3A,

FIG. 6B illustrating a sectional view corresponding to FIG. 3B, and

FIG. 6C illustrating a sectional view corresponding to FIG. 3C.

FIGS. 7A to 7C show process drawings for illustrating a method for producing a suspension board with circuit and show the steps of fining a base insulating layer:

FIG. 7A illustrating a sectional view corresponding to FIG. 3A,

FIG. 7B illustrating a sectional view corresponding to FIG. 3B, and

FIG. 7C illustrating a sectional view corresponding to FIG. 3C,

FIGS. 8A to 8C show process drawings for illustrating a method for producing a suspension board with circuit and show the steps of forming a conductive pattern:

FIG. 8A illustrating a sectional view corresponding to FIG. 3A,

FIG. 8B illustrating a sectional view corresponding to FIG. 3B, and

FIG. 8C illustrating a sectional view corresponding to FIG. 3C,

FIGS. 9A to 9C show process drawings for illustrating a method for producing a suspension board with circuit and show the steps of forming a cover insulating layer:

FIG. 9A illustrating a sectional view corresponding to FIG. 3A,

FIG. 9B illustrating a sectional view corresponding to FIG. 3B, and

FIG. 9C illustrating a sectional view corresponding to FIG. 3C,

FIGS. 10A to 10C show process drawings for illustrating a method for producing a suspension board with circuit and show the steps of forming first support opening portions:

FIG. 10A illustrating a sectional view corresponding to FIG. 3A,

FIG. 10B illustrating a sectional view corresponding to FIG. 3B, and

FIG. 10C illustrating a sectional view corresponding to FIG. 3C,

FIG. 11A illustrating a sectional view corresponding to FIG. 3A,

FIG. 11B illustrating a sectional view corresponding to FIG. 3B, and

FIG. 11C illustrating a sectional view corresponding to FIG. 3C.

FIG. 12A illustrating a sectional view corresponding to FIG. 3A,

FIG. 12B illustrating a sectional view corresponding to FIG. 3B, and

FIG. 12C illustrating a sectional view corresponding to FIG. 3C.

FIG. 13A illustrating a sectional view corresponding to FIG. 3A,

FIG. 13B illustrating a sectional view corresponding to FIG. 3B, and

FIG. 13C illustrating a sectional view corresponding to FIG. 3C.

FIG. 14A illustrating a sectional view corresponding to FIG. 3A,

FIG. 14B illustrating a sectional view corresponding to FIG. 3B, and

FIG. 14C illustrating a sectional view corresponding to FIG. 3C.

FIG. 15A illustrating a sectional view corresponding to FIG. 3A,

FIG. 15B illustrating a sectional view corresponding to FIG. 3B, and

FIG. 15C illustrating a sectional view corresponding to FIG. 3C.

FIG. 16A illustrating a sectional view corresponding to FIG. 3A,

FIG. 16B illustrating a sectional view corresponding to FIG. 3B, and

FIG. 16C illustrating a sectional view corresponding to FIG. 3C.

FIG. 17A illustrating a sectional view corresponding to FIG. 3A,

FIG. 17B illustrating a sectional view corresponding to FIG. 3B, and

FIG. 17C illustrating a sectional view corresponding to FIG. 3C.

FIG. 18A illustrating a sectional view corresponding to FIG. 3A,

FIG. 18B illustrating a sectional view corresponding to FIG. 3B, and

FIG. 18C illustrating a sectional view corresponding to FIG. 3C.

FIG. 19A illustrating a sectional view corresponding to FIG. 3A,

FIG. 19B illustrating a sectional view corresponding to FIG. 3B, and

FIG. 19C illustrating a sectional view corresponding to FIG. 3C.

FIG. 20A illustrating a sectional view corresponding to FIG. 3A,

FIG. 20B illustrating a sectional view corresponding to FIG. 3B, and

FIG. 20C illustrating a sectional view corresponding to FIG. 3C.

FIG. 21A illustrating a sectional view corresponding to FIG. 3A,

FIG. 21B illustrating a sectional view corresponding to FIG. 3B, and

FIG. 21C illustrating a sectional view corresponding to FIG. 3C.

DETAILED DESCRIPTION OF THE INVENTION

1. Structure of Suspension Board with Circuit

Figure 1:
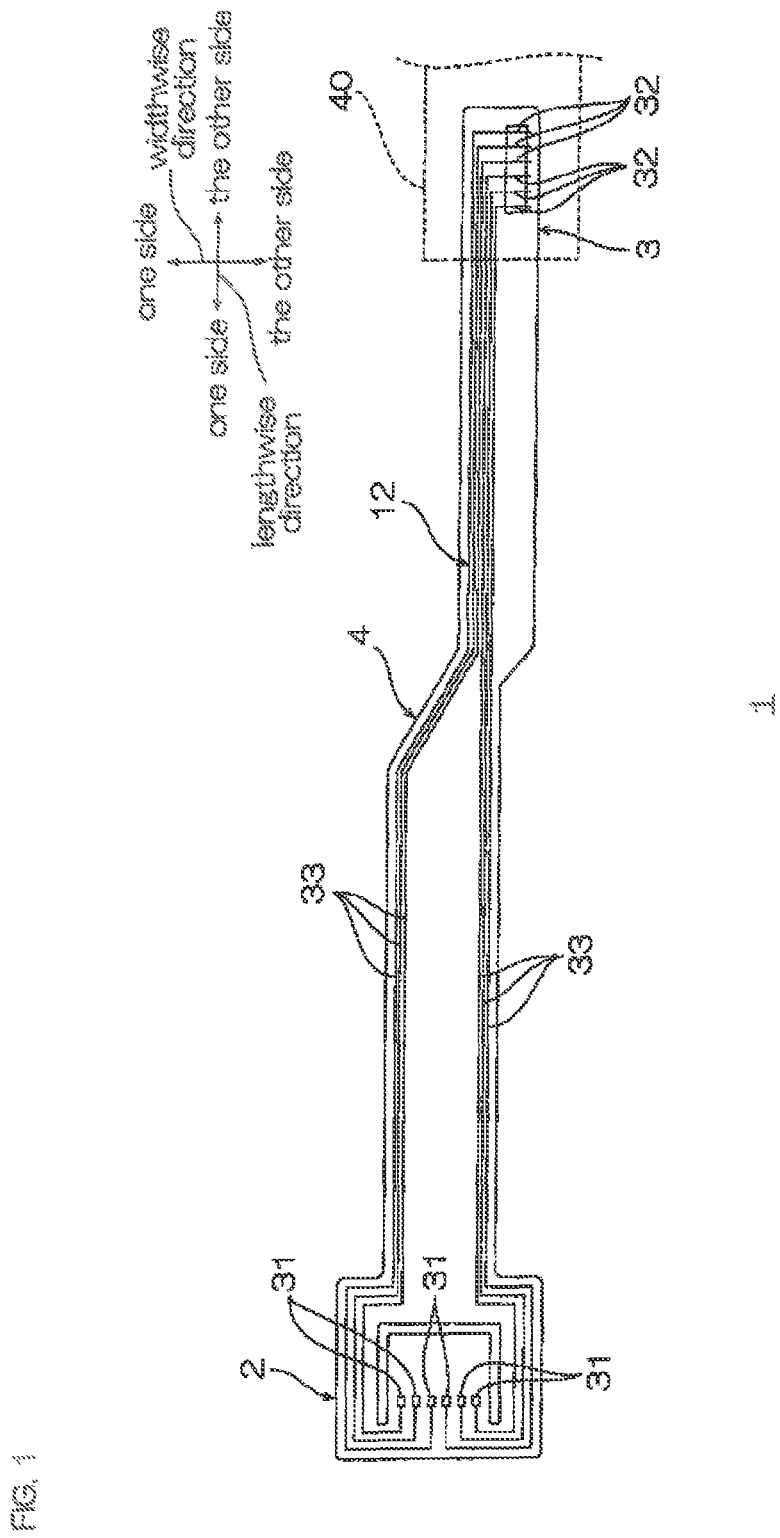
FIG. 1 shows a plan view of one embodiment of a suspension board with circuit of the present invention.

As shown in FIG. 1, a suspension board with circuit 1 is mounted on a hard disk drive and is mounted with a magnetic head (not shown). The suspension board with circuit 1 supports the magnetic head against the air flow when the magnetic head and a magnetic disk relatively run, while keeping a minute interval to the magnetic disk. The suspension board with circuit 1 is integrally formed with wires for connecting the magnetic head to a read/write board as an external circuit The suspension board with circuit 1 has a flat belt shape in a generally rectangular shape in plane view extending in a lengthwise direction. The suspension board with circuit 1 includes a slider mounting portion 2 that is disposed at one side in the lengthwise direction thereof and is mounted with a slider (not shown) including a magnetic head (not shown), an external connecting portion 3 that is disposed at the other side in the lengthwise direction thereof and is electrically connected to a read/write board 40, and a wire portion 4 that extends in the lengthwise direction between the slider mounting portion 2 and the external connecting portion 3.

In the following description, when referring to directions, the side at which the slider mounting portion 2 is provided (the left side of the paper surface in FIG. 1) is referred to as one side in the lengthwise direction and the side at which the external connecting portion 3 is provided (the right side of the paper surface in FIG. 1) is referred to as the other side in the lengthwise direction. The upper side of the paper surface in FIG. 1 is referred to as one side in a widthwise direction of the suspension board with circuit 1 arid the lower side of the paper surface in FIG. 1 is referred to as the other side in the widthwise direction. The near side of the paper surface in FIG. 1 is referred to as an upper side (one side in a thickness direction) of the suspension board with circuit 1 and the far side of the paper surface is referred to as a lower side (the other side in the thickness direction) of the suspension board with circuit 1. That is, an up-down direction is one example of the thickness direction of the suspension board with circuit In FIG. 1, a base insulating layer 11, a cover insulating layer 13, and a plating layer 34 are omitted so as to clearly show the relative arrangement of a supporting board 10 and a conductive pattern 12, in the same manner, in FIGS. 2 and 4, the cover insulating layer 13 and the plating layer 34 are omitted so as to clearly show the relative arrangement of the supporting board 10, the base insulating layer 11, and the conductive pattern 12.

As shown in FIGS. 3A to 3C, the suspension board with circuit 1 has a laminate structure. To be specific, the suspension board with circuit 1 is formed by sequentially laminating the supporting board 10 as one example of a metal supporting board, the base insulating layer 11, the conductive pattern 12 as one example of a conductive layer, and the cover insulating layer 13 from the lower side thereof upwardly.

The supporting board 10 is, for example, formed of a metal material such as stainless steel, 42-alloy, aluminum, copper-beryllium, and phosphor bronze. Preferably, the supporting board 10 is formed of stainless steel. The supporting board 10 has a generally flat plate shape in a generally rectangular shape in plane view extending in the lengthwise direction (ref: FIG. 1). The supporting board 10 has a thickness of, for example, 10 μm or more, and, for example, 50 μm or less, or preferably 25 μm or less.

Figure 2:
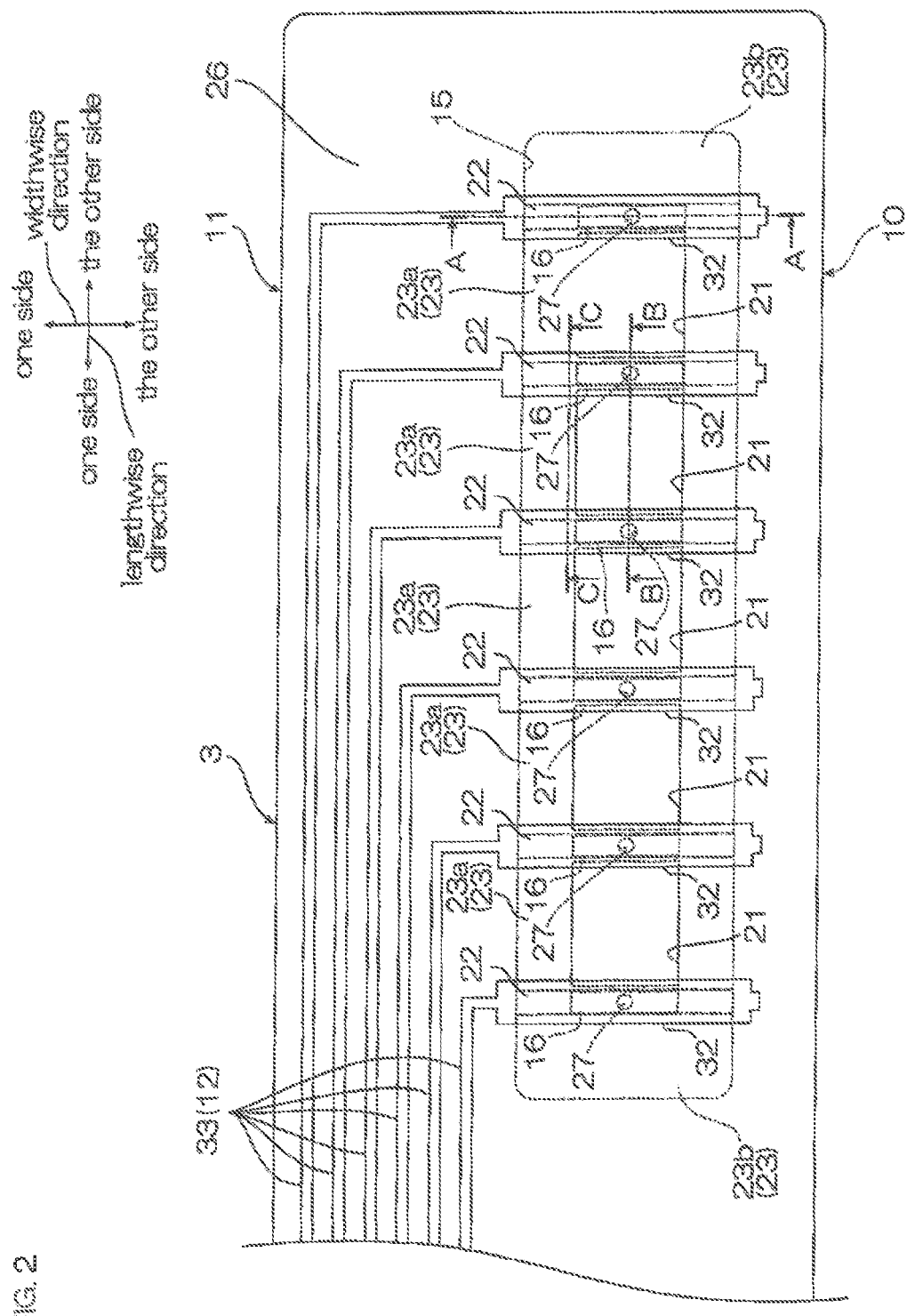
FIG. 2 shows an enlarged plan view of an external connecting portion of the suspension board with circuit shown in FIG. 1.

As shown in FIG. 2, the supporting board 10 has a support opening portion 15 and a plurality (six pieces) of terminal connecting portions 16 in a portion corresponding to the external connecting portion 3.

The support opening portion 15 is thrilled at the other-side end portion in the widthwise direction in the other-side end portion in the lengthwise direction of the supporting board 10. The support opening portion 15 has a generally rectangular shape in bottom view extending in the lengthwise direction and passes through the supporting board 10 in the up-down direction (ref: FIG. 3A).

The support opening portion 15 has a size in the lengthwise direction of, for example, 4000 μm or more, or preferably 5500 μm or more, and, for example, 20000 μm or less, or preferably 10000 μm or less. The support opening portion 15 has a size in the widthwise direction of, for example, 50 μm or more, or preferably 3000 μm or more, and, for example, 100 μm or less, or preferably 2000 μm or less.

Each of the plurality of terminal connecting portions 16 corresponds to each of a plurality of external terminals 32 (described later) and is disposed at the inside of the support opening portion 15 so as to be separated from the inner circumferential end edge (edge portion) of the support opening portion 15. Each of the plurality of terminal connecting portions 16 has a flat plate shape in a generally rectangular shape in bottom view extending in the widthwise direction. The plurality of terminal connecting portions 16 are disposed at equally spaced intervals to each other in the lengthwise direction.

Each of the plurality of terminal connecting portions 16 has a size in the lengthwise direction of fear example, 20 μm or more, or preferably 50 μm or more, and, for example, 1500 μm or less, or preferably 1200 μor less. Each of the plurality of terminal connecting portions 16 has a size in the widthwise direction of, for example, 20 μm or more, or preferably 30 μm or more, and, for example, 1200 μm or less, or preferably 800 m or less.

As shown in FIG. 3A, the base insulating layer 11 is laminated on the upper surface of the supporting board 10 and as a predetermined pattern, is disposed in a portion in which the conductive pattern 12 is formed. The base insulating layer 11 is, for example, formed of a synthetic resin. Examples of the synthetic resin include polyimide, polyamide imide, acryl, polyether, nitrile, polyether sulfone, polyethylene terephthalate (PET), polyethylene naphthalate, and polyvinyl chloride. Preferably, in view of thermal dimensional stability or the like, the base insulating layer 11 is formed of polyimide, As shown in FIG. 2, the base insulating layer 11 has a main body portion 26, a plurality (five pieces) of base opening portions 21, a plurality (six pieces) of thick portions 22, and a plurality (seven pieces) of thin portions 23.

The main body portion 26 is, when projected in the thickness direction, overlapped with a portion other than the support opening portion 15 in the supporting board 10. The outer shape of the main body portion 26 is generally the same as that of the supporting board 10.

The main body portion 26 has a thickness of, for example, 1 μm or more, or preferably 3 μm or more, and, for example, 15 μm or less, or preferably 25 μm or less.

Each of the plurality of base opening portions 21 is, when projected in the thickness direction, included in the support opening portion 15 in the supporting board 10 and is disposed between the terminal connecting portions 16 that are adjacent to each other in the lengthwise direction. Each of the plurality of base opening portions 21 has a generally rectangular shape in bottom view and passes through the base insulating layer 11 in the up-down direction (ref: FIG. 3B).

Each of the plurality of base opening portions 21 has a size in the lengthwise direction of for example, 50 μm or more, or preferably 80 μm or more, and, for example, 1500 μm or less, or preferably 1200 μm or less. Each of the plurality of base opening portions 21 has a size in the widthwise direction of for example, 50 μm or more, or preferably 80 μm or more, and for example, 1500 μor less, or preferably 1200 μm or less.

The plurality of thick portions 22 are, when projected in the thickness direction, disposed at the inside of the support opening portion 15 in the supporting board 10 and are disposed at spaced intervals to each other in the lengthwise direction. To be specific, the plurality of thick portions 22 are, when projected in the thickness direction, disposed between the plurality of base opening portions 21 in the lengthwise direction and at both outer sides in the lengthwise direction of the base opening portions 21 that are disposed at both outer sides in the lengthwise direction (ref: FIG. 2). Each of the plurality of thick portions 22 has a generally rectangular shape in bottom view extending in the widthwise direction. One-side end edge in the widthwise direction of each of the plurality of thick portions 22 is overlapped with one-side end edge in the widthwise direction of the support opening portion 15 in the supporting board 10. The other-side end edge in the widthwise direction thereof is overlapped with the other-side end edge in the widthwise direction of the support opening portion. 15 in the supporting board 10. The plurality of thick portions 22 are continuous to the main body portion, 26. Each of the plurality of thick portions 22 has a connecting opening portion 27.

The connecting opening portion 27 is disposed at each of the central portions of the plurality of thick portions 22. The connecting opening portion 27 has a generally circular shape in plane view and passes through each of the plurality of thick portions 22 in the up-down direction.

Of the plurality of thick portions 22, portions thereof that are laminated on the upper surfaces of the plurality of terminal connecting portions 16 are one example of an insulating portion.

The size in the lengthwise direction of each of the plurality of thick portions 22 is generally the same as that in the lengthwise direction of each of the plurality of terminal connecting portions 16. The size in the widthwise direction of each of the plurality of thick portions 22 is generally the same as that in the widthwise direction of the support opening portion 15 in the supporting board 10. The, thickness of each of the plurality of thick portions 22 is generally the same as that of the main body portion 26.

The connecting opening portion 27 has a diameter of, for example, 5 μm or more, or preferably 10 μm or more, and, for example, 100 μm or less, or preferably 90 μm or less.

The plurality of thin portions 23 are, when projected in the thickness direction, disposed in a portion other than the plurality of base opening portions 21 and the plurality of thick portions 22 at the inside of the support opening portion 15 in the supporting board 10. To be specific, the plurality of thin portions 23 are defined so as to be spaced apart from each other in the lengthwise direction by the plurality of thick portions 22. Of the plurality of thin portions 23, those other than the thin portions 23 that are disposed at both outer sides in the lengthwise direction are defined as central thin portions 23a and those that are disposed at both outer sides in the lengthwise direction are defined as end-thin portions 23b.

The plurality of central thin portions 23a are disposed at each of the outer sides of the plurality of base opening portions 21. Each of the plurality of central thin portions 23a has a generally rectangular frame shape in bottom view and is continuous to each of the inner circumferential end edges (edge portions) of the plurality of base opening portions 21. Each of one-side end portions in the lengthwise direction of the plurality of central thin portions 23a is continuous to each of the other-side end portions in the lengthwise direction of the plurality of thick portions 22. Each of the other-side end portions in the lengthwise direction of the plurality of central thin portions 23a is continuous to each of one-side end portions in the lengthwise direction of the plurality of thick portions 22. One-side end edge in the widthwise direction of each, of the plurality of central thin portions 23a is, when projected in the thickness direction, overlapped with one-side end edge in the widthwise direction of the support opening portion 15 in the supporting board 10. The other-side end edge in the widthwise direction thereof is overlapped with the other-side end edge in the widthwise direction of the support opening portion 15 in the supporting board 10. That is, each of the plurality of central thin portions 23a is defined as a portion surrounded by each of the one-side end edges in the lengthwise direction of the plurality of thick portions 22, each of the other-side end edges in the lengthwise direction of the plurality of thick portions 22, one-side end edge in the widthwise direction of the support opening portion 15, and the other-side end edge in the widthwise direction of the support opening portion 15 and excluding the base opening portions 21.

Each of one-side end portions in the widthwise direction of the plurality of central thin portions 23a is disposed along each of the inner circumferential end edges (edge portions) at one side in the widthwise direction of the plurality of base opening portions 21. Each of the other-side end portions in the widthwise direction of the plurality of central thin portions 23a is disposed along each of the end edges (edge portions) at the other side in the widthwise direction of the plurality of base opening portions 21.

The end-thin portion 23b that is disposed at one side in the lengthwise direction is continuous to the thick portion 22 that is disposed at the most one side in the lengthwise direction. That is, the end-thin portion 23b that is disposed at the one side in the lengthwise direction is defined as a portion surrounded by one-side end edge in the lengthwise direction of the thick portion 22 that is disposed at the most one side in the lengthwise direction, one-side end edge in the lengthwise direction of the support opening portion 15, one-side end edge in the widthwise direction of the support opening portion 15, and the other-side end edge in the widthwise direction of the support opening portion 15.

The end-thin portion 23b that is disposed at the other side in the lengthwise direction is continuous to the thick portion 22 that is disposed at the most other side in the lengthwise direction. That is, the end-thin portion 23b that is disposed at the other side in the lengthwise direction is defined as a portion surrounded by the other-side end edge in the lengthwise direction of the thick portion 22 that is disposed at the most other side in the lengthwise direction, the other-side end edge in the lengthwise direction of the support opening portion 15, the one-side end edge in the widthwise direction of the support opening portion 15, and the other-side end edge in the widthwise direction of the support opening portion 15.

The size in the lengthwise direction at each of the central portions in the widthwise direction of the plurality of central thin portions 23a, to be specific, the size from each of the one-side end edges in the lengthwise direction of the plurality of central thin portions 23a to each of the one-side end edges in the lengthwise direction of the plurality of base opening portions 21 is, for example, 50 µm or more, or preferably 80 µm or more, and for example, 1500 µm or less, or preferably 1200 µm or less. The size from each of the other-side end edges in the lengthwise direction of the plurality of central thin portions 23a to each of the other-side end edges in the lengthwise direction of the plurality of base opening portions 21 is, fin example, 50 µm or more, or preferably 80 µm or more, and, for example, 1500 µm or less, or preferably 1200 µm or less.

The size from each of the one-side end edges in the widthwise direction of the plurality of central thin portions 23a to each of the one-side end edges in the widthwise direction of the plurality of base opening portions 21 is, for example, 5 µm or more, or preferably 10 µm or more, and, for example, 1000 µm or less, or preferably 800 µm or less. The size from each of the other-side end edges in the widthwise direction of the plurality of central thin portions 23a to each of the other-side end edges in the widthwise direction of the plurality of base opening portions 21 is, for example, 50 µm or more, or preferably 80 µm or more, and, for example 1500 µm or less, or preferably 1200 µm or less.

Each of the plurality of end-thin portions 23b has a size in the lengthwise direction of, for example, 50 µm or more, or preferably 80 µm or more, and, for example, 1500 µm or less, or preferably 1200 µm or less.

The size in the widthwise direction of each, of the plurality of thin portions 23 (the size in the widthwise direction of each of the plurality of central thin portions 23a and the size in the widthwise direction of each of the plurality of end-thin portions 23b) is generally the same as that in the widthwise direction of the support opening portion 15 in the supporting board 10. The thickness of each of the plurality of thin, portions 23 (the thickness of each of the plurality of central thin portions 23a and the thickness of each of the plurality of end-thin portions 23b) is thinner than that of the main body portion 26 and the thick portion 22. The thickness of each of the plurality of thin portions 23 with respect to 100% of the thickness of the main body portion 26 and the thick portion 22 is, for example, 5% or more, or preferably 10% or more, and, for example, 90% or less, or preferably 80% or less, to be specific, 50%.

As shown in FIG. 3A, the conductive pattern 12 is laminated on the upper surface of the base insulating layer 11. The conductive pattern 12 is, for example, formed of a conductive material such as copper, nickel, gold, and solder or an alloy thereof. Preferably, the conductive pattern 12 is formed of copper.

The conductive pattern 12 has a thickness of, for example, 3 µm or more, or preferably 5 µm or more, and, for example, 30 µm or less, or preferably 20 µm or less.

The conductive pattern 12, as a predetermined wired circuit pattern, is disposed on the upper surface of the base insulating layer 11. As shown in FIG. 1, to be specific, the conductive pattern 12 includes a plurality (six pieces) of head-side terminals 31, a plurality (six pieces) of external terminals 32 as one example of a terminal portion, and a plurality (six pieces) of wires 33.

The plurality of head-side terminals 31 are disposed in parallel at equally spaced intervals to each other in the widthwise direction in the slider mounting portion 2. The head-side terminals 31 have generally rectangular shapes (square land) in plane view. The head-side terminals 31 are electrically connected to the magnetic head (not shown) of the slider (not shown).

As shown in FIG. 2, the plurality of external terminals 32 are disposed in parallel at spaced intervals to each other in the lengthwise direction, in the external connecting portion 3. The plurality of external terminals 32 are, when projected in the thickness direction, disposed so as to be overlapped with the support opening portion 15. Each of the plurality of external terminals 32 has a generally rectangular shape (square land) in plane view. Each of the plurality of external terminals 32 is, when projected in the thickness direction, overlapped with each of the plurality of terminal connecting portions 16 so that the outer edge thereof includes each of the plurality of terminal connecting portions 16. Both side end portions in the widthwise direction thereof are overlapped with the inner circumferential end edge of the support opening portion 15. Each of the central portions of the plurality of external terminals 32 fills each of the insides of the plurality of connecting opening portions 27 and is dented downwardly. The lower surface of each of the central portions of the plurality of external terminals 32 is in contact with each of the upper surfaces of the plurality of terminal connecting portions 16. That is, each of the plurality of external terminals 32 is electrically connected to each of the plurality of terminal connecting portions 16 via each of the plurality of connecting opening portions 27.

Each of the plurality of external terminals 32 is, when projected in the thickness direction, overlapped with each of the plurality of thick portions 22. The plurality of external terminals 32, excluding those that are disposed at both outer sides in the lengthwise direction, are, when projected in the thickness direction, disposed between the plurality of base opening portions 21. When projected in the thickness direction, the external terminal 32 that is disposed at the most one side in the lengthwise direction is disposed at one side in the lengthwise direction with respect to the base opening portion 21 that is disposed at the most one side in the lengthwise direction, and the external terminal 32 that is disposed at the most other side in the lengthwise direction is disposed at the other side in the lengthwise direction with respect to the base opening portion 21 that is disposed at the most other side in the lengthwise direction.

One-side end portion its the lengthwise direction of each of the plurality of external terminals 32, excluding the one that is disposed at the most one side in the lengthwise direction, is, when projected in the thickness direction, overlapped with the other-side end portion of each of the plurality of base opening portions 21. The other-side end portion in the lengthwise direction of each of the plurality of external terminals 32, excluding the one that is disposed at the most other side in the lengthwise direction, is, when projected in the thickness direction, overlapped with the one-side end portion of each of the plurality of base opening portions 21. One-side end portion of the external terminal 32 that is disposed at the most one side in the lengthwise direction is overlapped with the end-thin portion 23*b* that is disposed at the one side. The other-side end portion of the external terminal 32 that is disposed at the most other side in the lengthwise direction is overlapped with the end-thin portion 23*b* that is disposed at the other side.

The cover insulating layer 13 to be described later is not formed on each of the upper surfaces of the plurality of external terminals 32. As described above, each of the plurality of external terminals 32 is electrically connected to each of the plurality of terminal connecting portions 16. That is, each of the plurality of external terminals 32 is configured as a flying lead that is electrically connectable from the upper and lower sides thereof.

Each of the plurality of external terminals 32 has a size in the lengthwise direction of, for example, 100 µm or more, or preferably 150 µm or more, and, for example, 400 µm or less, or preferably 300 µm or less. Each of the plurality of external terminals 32 has a size in the widthwise direction of, for example, 50 µm or more, or preferably 100 µm or more, and, for example, 3000 µm or less, or preferably 2000 µm or less. A gap between the plurality of external terminals 32 in the lengthwise direction is, for example, 100 µm or more, or preferably 150 µm or more, and, for example, 400 µm or less, or preferably 300 µm or less.

As shown in FIG. 3B, the plating layers 34 are provided on the upper surface, the one-side surface in the lengthwise direction, the other-side surface in the lengthwise direction, the lower surface of the one-side end portion in the widthwise direction, and the lower surface of the other-side end portion in the widthwise direction of each of the plurality of external terminals 32.

The plating layer 34 is, for example, formed of nickel and gold and has a thickness of, or example, 0.05 µm or more, or preferably 0.1 µm or more, and, for example, 5 µm or less, or preferably 3 µm or less. The plating layer 34 may be formed of a single plating layer or a lamination of a plurality of plating layers.

As shown in FIG. 1 each of the plurality of external terminals 32 is electrically connected to an external terminal (not shown) of the read/write board 40.

The plurality of wires 33 connect the plurality of head-side terminals 31 to the plurality of external terminals 32. To be more specific, the plurality of wires 33 are disposed in parallel at spaced intervals to each other in the widthwise direction in the wire portion 4 and are formed so as to extend in the lengthwise direction. In the slider mounting portion 2, the wires 33 expand outwardly in the widthwise direction to extend toward one side in the lengthwise direction and then, extend inwardly in the widthwise direction to be folded back to the other side in the lengthwise direction. The other-side end portions in the lengthwise direction of the wires 33 are connected to the one-side end portions in the lengthwise direction of the head-side terminals 31. The wires 33 are, in the external connections portion 3, bent toward the other side in the widthwise direction and then, the other-side end portions in the widthwise direction thereof are connected to the one-side end portions in the widthwise direction of the external terminals 32 (ref: FIG. 2). The width of the wires 33 is formed to be narrower than that of the head-side terminals 31 and the external terminals 32.

As shown in FIG. 3A, the cover insulating layer 13 is laminated on the upper surface of the base insulating layer 11 so as to cover the conductive pattern 12 from above. To be specific, the cover insulating layer 13 covers the conductive pattern 12 from above so as to expose the plurality of head-side terminals 31 and the plurality of external terminals 32.

The cover insulating layer 13 is formed of the same synthetic resin as that of the base insulating layer 11. Preferably, the cover insulating layer 13 is formed of polyimide. The cover insulating layer 13 has a thickness of, for example 2 to 20 µm.

2. Method for Producing Suspension Board with Circuit

Next, a method fur producing the suspension board with circuit 1 is described with reference to FIGS. 5A to 12C.

Figure 5A:
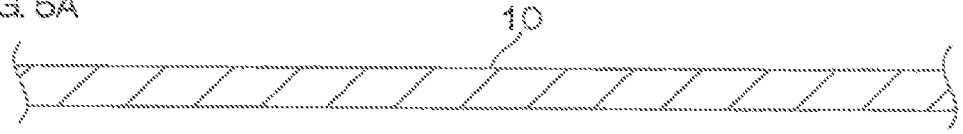
FIGS. 5A to 5C show process drawings for illustrating a method for producing a suspension board with circuit and show the steps of preparing a metal supporting board.
Figure 5B:
Figure 5C:
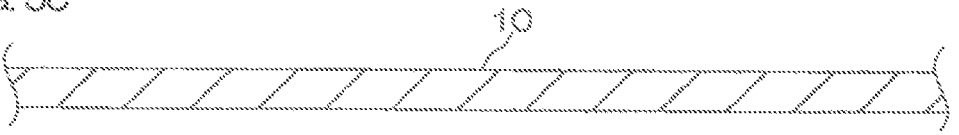

As shown in FIGS. 5A to 5C, in the method for producing the suspension board with circuit 1, first, the supporting board 10 is prepared.

Figure 6A:
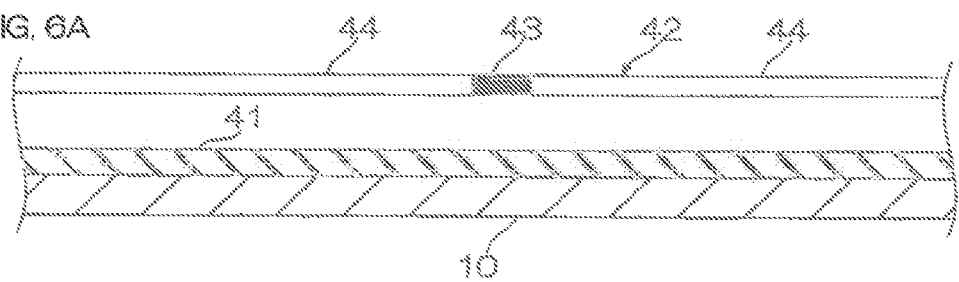
FIGS. 6A to 6C show process drawings for illustrating a method for producing a suspension board with circuit and show the steps of forming a base film.
Figure 6B:
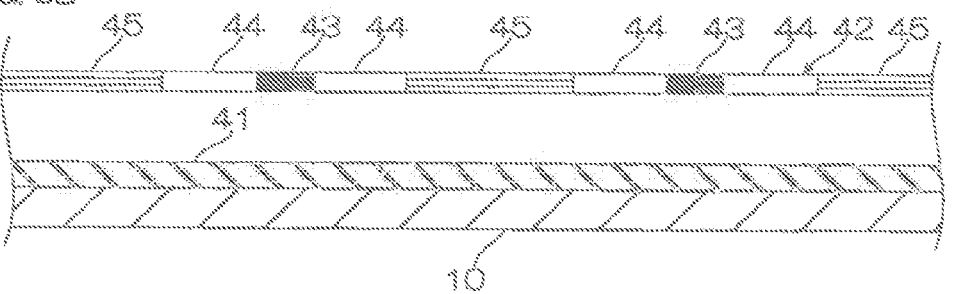
Figure 6C:
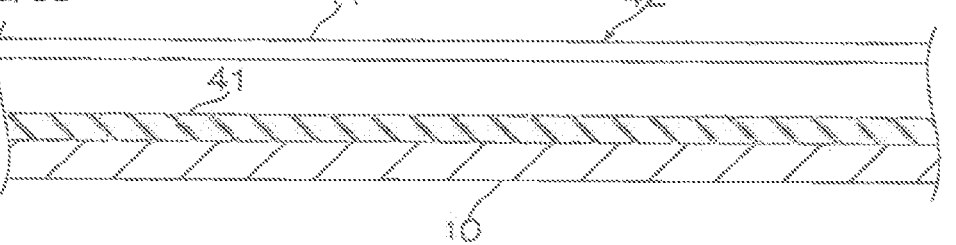

Next, as shown in FIGS. 6A to 6C, a solution (varnish) of a synthetic resin having photosensitivity that is a material of the base insulating layer 11 is applied to the upper surface of the supporting board 10 to be then dried, thereby forming a base film 41 having photosensitivity.

Thereafter, a photomask 42 is disposed in opposed relation to the upper side of the photosensitive base film 41.

The photomask 42 includes a light shielding portion 43, a light fully transmitting portion 44, and a light semi-transmitting portion 45 in a predetermined pattern. To be specific, in the base film 41, the light shielding portion 43 is disposed at the upper side of portions corresponding to the connecting opening portions 27 in the base insulating layer 11; the light fully transmitting portion 44 is disposed at the upper side of portions corresponding to the thick portions 22, the thin portions 23, and the main body portion 26 in the base insulating layer 11; and the light semi-transmitting portion 45 is disposed at the upper side of portions corresponding to the base opening portions 21 in the base insulating layer 11.

Then, the base film 41 is exposed to light via the photomask 42.

Next, the base him 41 after exposure to light is developed and is thermally cured.

In this manner, the base insulating layer 11 is formed on the upper surface of the supporting board 10 in a predetermined pattern. To be specific, as shown in FIGS. 7A and 7B, of the base film 41, the portions thereof that are disposed at the lower side of the light shielding portions 43 are formed as the connecting opening portions 27. As shown in FIGS. 7A to 7C, of the base film 41, the portions thereof that are disposed at the lower side of the light fully transmitting portions 44 are formed as fully thick portions 46 that are relatively thick. As shown in FIG. 7B, of the base film 41, the portions thereof that are disposed at the lower side of the light semi-transmitting portions 45 are formed as semi-thick portions 47 that are relatively thin as one example of a first portion.

Of the fully thick portions 46, the portions thereof corresponding to the thick portions 22 and the thin portions 23 in the base insulating layer 11 are one example of a second portion. As shown in FIG. 7B, of the fully thick portions 46, the portions thereof corresponding to the thick portions 22 and the thin portions 23 in the base insulating layer 11 are disposed so as to surround the semi-thick portions 47.

Thereafter, as shown in FIGS. 8A to 8C, the conductive pattern 12 is formed on the upper surface of the base insulating layer 11.

To form the conductive pattern 12 on the upper surface of the base insulating layer 11, the conductive pattern 12 may be, for example, formed on the upper surface of the base insulating layer 11 by a known patterning method such as a subtractive method or an additive method. Preferably, an additive method is used.

In this manner, the conductive pattern 12 including the plurality of head-side terminals 31, the plurality of external terminals 32, and the plurality of wires 33 is formed on the upper surface of the base insulating layer 11 (ref: FIG. 1).

In view of suppression of scattering to the cover insulating layer 13, preferably, the conductive pattern 12 is covered with plating (for example, nickel plating). To thus cover the conductive pattern 12 with plating, for example, either method of electrolytic plating or electroless plating may be used. Preferably, electroless plating is used.

As shown in FIGS. 9A to 9C, to be specific, as shown in FIG. 9A, the cover insulating layer 13 is formed on the upper surface of the base insulating layer 11.

To form the cover insulating layer 13 on the upper surface of the base insulating layer 11, for example, first, a synthetic resin (varnish) having photosensitivity that is a material of the cover insulating layer 13 is applied to the upper surface of the base insulating layer 11 including the conductive pattern 12 to be then dried, thereby forming a cover film having photosensitivity The cover film is exposed to light and developed to be then thermally cured. In this manner, the cover insulating layer 13 is formed on the upper surface of the base insulating layer 11.

Then, the head side terminals 31 and the external terminals 32 of the conductive pattern 12 are exposed from above. The plurality of wires 33 of the conductive pattern 12 are covered with the cover insulating layer 13.

Next, as shown in FIGS. 10A to 10C to be specific, as shown in FIGS. 10B and 10C, the supporting board 10 is partially removed and a plurality of first support opening portions 51 are formed in the supporting board 10.

To be specific, the plurality of first support opening portions 51 are, when projected in the thickness direction, formed in a portion that is overlapped with the support opening portion 15 and in a region excluding the portions that are overlapped with the plurality of thick portions 22. To be more specific, as shown in FIG. 4, the plurality of first support opening portions 51 are formed in the portion corresponding to the above-described support opening portion 15 and are disposed at spaced intervals in the lengthwise direction. That is, of the base insulating layer 11, the portions thereof that are, when projected in the thickness direction, overlapped with the first support opening portions 51 correspond to the base opening portions 21 and the thin portions 23 described above.

To form the first support opening portions 51, for example, an etching method such as dry etching (for example, plasma etching) or wet etching (for example, chemical etching), drilling, or laser processing are used. Preferably, wet etching is used.

In this manner, as shown in FIGS. 10B and 10C, the plurality of first support opening portions 51 are funned in the supporting board 10.

Thereafter, the base insulating layer 11 that is exposed via each of the plurality of first support opening portions 51 is etched by the above-described etching method such as wet etching (far example, chemical etching).

Figure 11A:
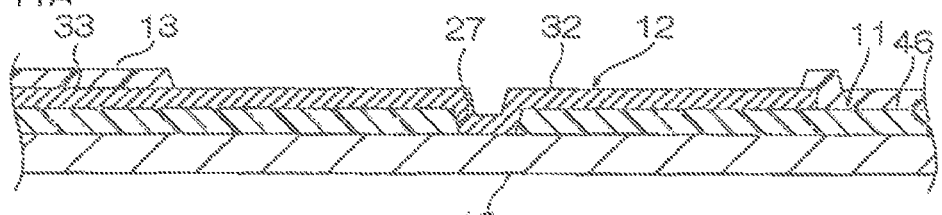
FIGS. 11A to 11C show process drawings for illustrating a method for producing a suspension board with circuit and show the steps of etching a base insulating layer.
Figure 11B:
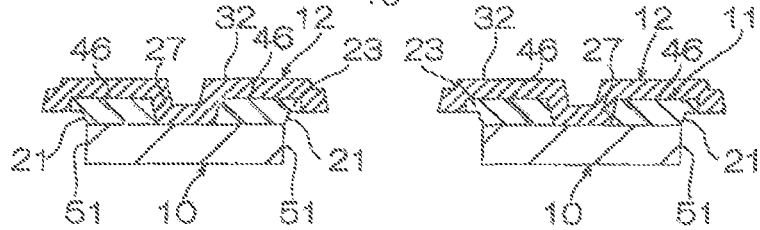
Figure 11C:
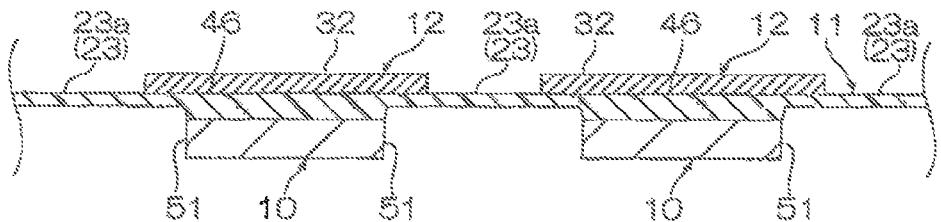
Figure 12A:
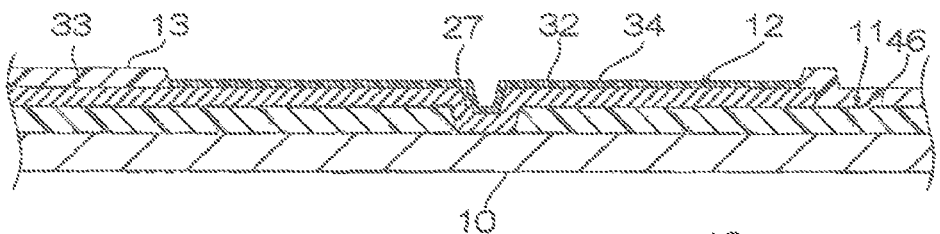
FIGS. 12A to 12C show process drawings for illustrating a method for producing a suspension board with circuit and show the steps of forming a plating layer.
Figure 12B:
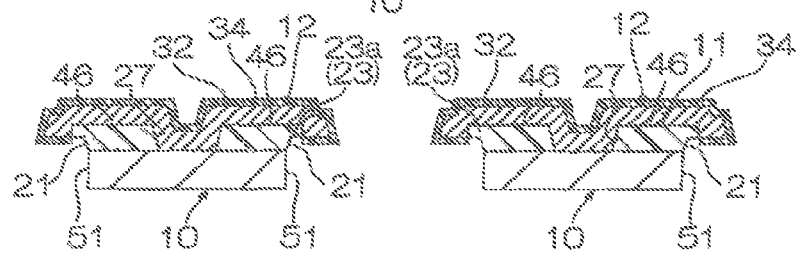
Figure 12C:
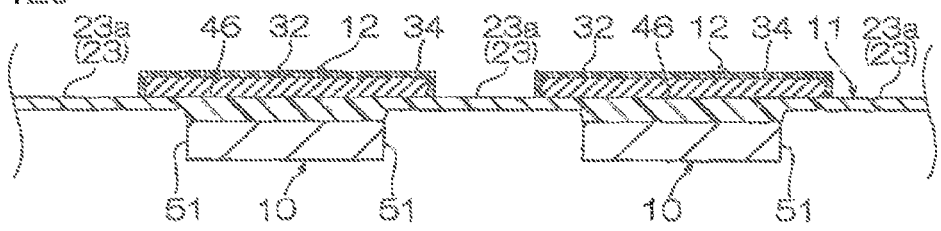

In this manner, as shown in FIGS. 11A to 11C, to be specific, as shown in FIG. 11B, in the base insulating layer 11, the semi-thick portions 47 are removed to form the plurality of base opening portions 21 and as shown in FIGS. 11B and 11C, the filly thick portions 46 that are continuous to each of the circumferential edge portions of the plurality of base opening portions 21 and after etching are funned as the plurality of thin portions 23, As shown in FIGS. 12A to 12C the plating layers 34 are formed in the external terminals 32.

To form the plating layer 34, electrolytic plating is used. To be specific, the external terminals 32 are electrically conducted via the supporting board 10 and the plating layers 34 are formed on the surfaces of the external terminals 32.

Next, as shown in FIGS. 3A to 3C, to be specific, as shown in FIGS. 3A and 3C, the supporting board 10 is partially removed and a plurality (ten pieces) of second support opening portions 52 are formed in the supporting board 10.

To be specific, the plurality of second support opening portions 52 are formed in a portion that is, when projected in the thickness direction, overlapped with the support opening portion 15 and is overlapped with the plurality of thick portions 22. To be more specific, as shown in FIG. 4, the plurality of second support opening portions 52 are fanned so as to be disposed in a region between the plurality of first support opening portions 51 and at both side end portions in the widthwise direction. That is, the plurality of second support opening portions 52 are, when projected in the thickness direction, formed in the supporting board 10 so as to leave the plurality of terminal connecting portions 16, in other words, to leave the portion that is overlapped with each of the central portions of the plurality of external terminals 32.

To form the second support opening portions 52, for example, an etching method such as dry etching (for example, plasma etching) or wet etching (for example, chemical etching), drilling, or laser processing are used. Preferably, wet etching is used.

In this manner, as shown in FIG. 3A, the plurality of second support opening portions 52 are formed in the supporting board 10. The plurality of second support opening portions 52 are communicated with, the plurality of first support opening portions 51, thereby forming the support opening portion 15. As shown in FIGS. 3A and 3B, the plurality of terminal connecting portions 16 are formed. As shown in FIG. 4, in the base insulating layer 11, when projected in the thickness direction, the fully thick portions 46 that are overlapped with the plurality of second support opening portions 52 and the fully thick portions 46 that are overlapped with the plurality of terminal connecting portions 16 (ref; FIG. 38) are formed as the plurality of thick portions 22.

As described above, the production of the suspension board with circuit 1 is completed.

3. Function and Effect

According to the method for producing the suspension board with circuit 1, as shown in FIGS. 10A and 10B, in the step of forming the first support opening portions 51 by etching the supporting board 10, the first support opening portions 51 are not formed in the portions that are, when projected in the thickness direction, overlapped with the plurality of external terminals 32 in the supporting board 10.

As shown in FIG. 3A, after the step of etching the base insulating layer 11, the plurality of second support opening portions 52 are formed in the portion that is, when projected in the thickness direction, overlapped with each of the end portions of the plurality of external terminals 32 in the widthwise direction, so that in the base insulating layer 11, the fully thick portions 46 that are overlapped with the plurality of second support opening portions 52 are formed as the plurality of thick portions 22 that are not etched.

According to the suspension board with circuit 1 and the method for producing the suspension board with circuit 1, as shown in FIG. 3A, each of the plurality of thick portions 22 is, when projected in the thickness direction, disposed so as to be overlapped with each of the plurality of external terminals 32 and among all, is disposed so as to be overlapped with each of the end portions of the plurality of external terminals 32 in the widthwise direction.

Thus, the rigidity of each of the end portions of the plurality of external terminals 32 in the widthwise direction can be relatively increased by each of the plurality of thick portions 22.

As a result, each of the end portions of the plurality of external terminals 32 in the widthwise direction can be reinforced.

Each of the plurality of thin portions 23 is. When projected in the thickness direction, disposed between the plurality of external terminals 32 in the lengthwise direction.

As a result, the rigidity of the base insulating layer 11 between the plurality of external terminals 32 can be relatively reduced.

Accordingly, when vibrations and stress occur in one piece of external terminal the vibrations and the stress can be reduced or absorbed by the thin portions 23, and the transmission of the vibrations and the stress to the external terminal 32 that is adjacent to the one piece of external terminal 32 can be suppressed.

Therefore, the connection reliability of each of the plurality of external terminals 32 can be improved.

According to the suspension board with circuit 1 and the method for producing the suspension board with circuit 1, as shown in FIG. 3A, when each of the plurality of terminal connecting portions 16 is electrically connected, each of the, plurality of external terminals 32 is electrically connected via each of the plurality of terminal connecting portions 16.

Thus, both sides of the upper side and the lower side of each of the plurality of external terminals 32 can be electrically connected.

4. Second Embodiment

Modified examples of the suspension board with circuit and the producing method thereof are described with reference to FIGS. 13A to 21C. In the modified examples, the same reference numerals are provided for members corresponding to each of those described above, and their detailed description is omitted. (1) Structure of Second Embodiment of Suspension Board with Circuit In the above-described first embodiment, as shown in FIG. 3B, the suspension board with circuit I includes the plurality of terminal connecting portions 16.

Figure 21A:
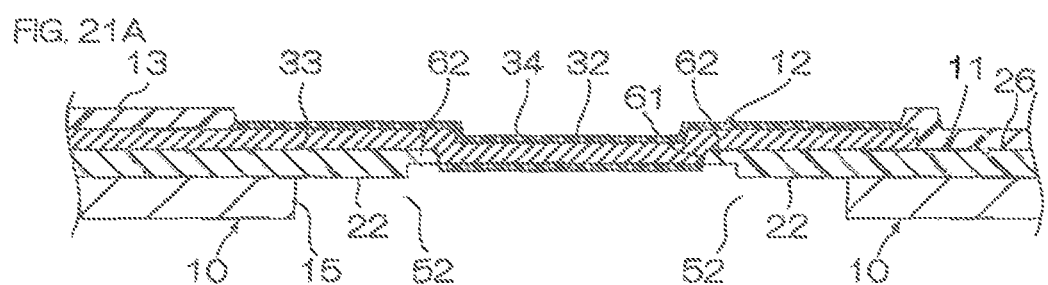
FIGS. 21A to 21C show process drawings for illustrating a method for producing a second embodiment of a suspension board with circuit and show the steps of forming second support opening portions.
Figure 21B:

On the contrary, in the second embodiment, as shown in FIG. 21B, the suspension board with circuit 1 does not include the plurality of terminal connecting portions 16.

To be more specific, as shown in FIG. 21A, the base insulating layer 11 includes a plurality (six pieces) of exposed opening portions 61 and a plurality (12 pieces) of opening end portions 62.

Each of the plurality of exposed opening portions 61 has a generally rectangular shape extending in the widthwise direction and passes through the base insulating layer 11 in the up-down direction. Each of the plurality of exposed opening portions 61 is, when projected in the thickness direction, overlapped with each of the central portions of the plurality of external terminals 32. To be specific, the plurality of exposed opening portions 61 are disposed at spaced intervals to each other in the lengthwise direction and are disposed between the plurality of base opening portions 21 in the lengthwise direction and at the outer side in the lengthwise direction of the base opening portion 21 that is disposed at the most outer side in the lengthwise direction (ref FIG. 2). Each of the plurality of exposed opening portions 61 is communicated with each of the plurality of base opening portions 21.

Each of the plurality of opening end portions 42 is disposed so as to be opposed to each of both outer side end portions in the widthwise direction of the plurality of exposed opening portions 61. Each of the plurality of opening end portions 62 is continuous to both inner side end portions in the widthwise direction of the plurality of thick portions 22. The thickness of each of the plurality of opening end portions 62 is the same as that of each of the plurality of thin portions 23.

Each of the plurality of external terminals 32 is disposed corresponding to each of the plurality of exposed opening portions 61 and is disposed so as to sink in each of the plurality of exposed opening portions 61. The upper and lower surfaces of each of the central portions in the widthwise direction of the plurality of external terminals 32 are exposed. That is the upper and lower surfaces of each of the plurality of external terminals 32, excluding a portion that is overlapped with each of the plurality of thick portions 22, are exposed, when projected in the thickness direction.

(2) Method for Producing Second Embodiment of Suspension Board with Circuit

Figure 13A:
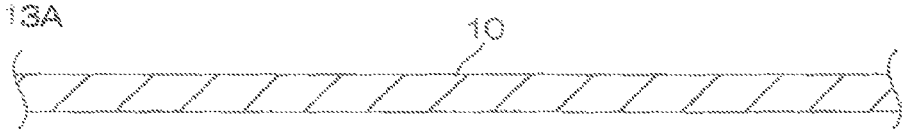
FIGS. 13A to 13C show process drawings for illustrating a method for producing a second embodiment of a suspension board with circuit and show the steps of preparing a metal supporting board.
Figure 13B:
Figure 13C:
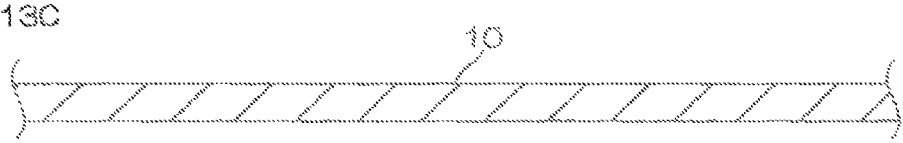

In the method for producing the second embodiment of the suspension board with circuit 1, first, as shown in FIGS. 13A to 13C, the supporting board 10 is prepared.

Figure 14A:
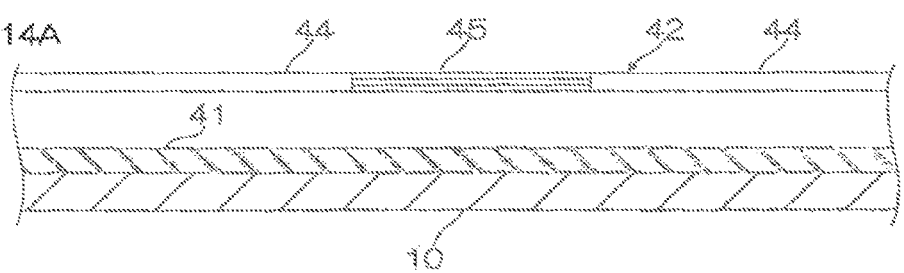
FIGS. 14A to 14C show process drawings for illustrating a method for producing a second embodiment of a suspension board with circuit and show the steps of forming a base film.
Figure 14B:
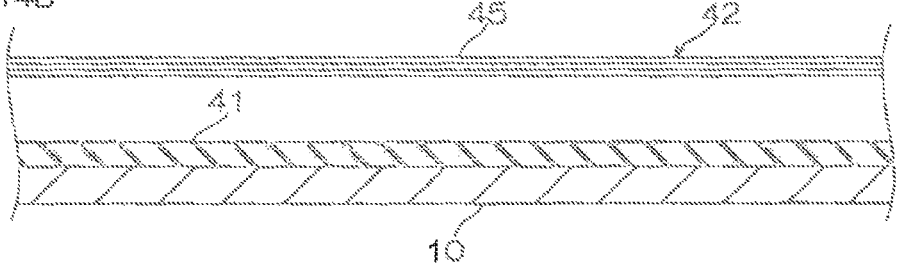
Figure 14C:
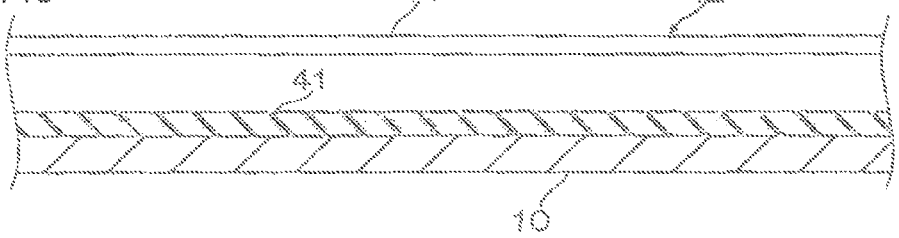

Next, as shown in FIGS. 14A to 14C, a solution (varnish) of a synthetic resin having photosensitivity that is a material of the base insulating layer 11 is applied to the upper surface of the supporting board 10 to be then dried, thereby forming the base film 41 having photosensitivity.

Thereafter, the photomask 42 is disposed in opposed relation to the upper side of the photosensitive base film 41.

To be specific, the light fully transmitting portion 44 is disposed at the upper side of portions corresponding to the thick portions 22, thin portions 23, and the main body portion 26 in the base insulating layer 11, and the light semi-transmitting portion 45 is disposed at the upper side of portions corresponding to the base opening portions 21 and the exposed opening portions 61 in the base insulating layer 11.

Then, the base film 41 is exposed to light via the photomask 42.

Next, the base film 41 after exposure to light is developed and is thermally cured.

Figure 15A:
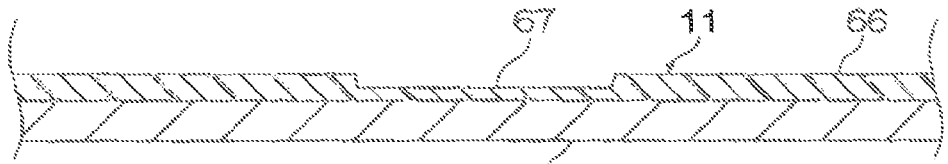
FIGS. 15A to 15C show process drawings or illustrating a method for producing a second embodiment of a suspension board with circuit and show the steps of forming a base insulating layer.
Figure 15B:
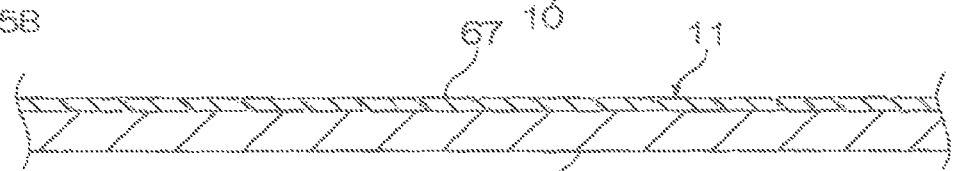
Figure 15C:
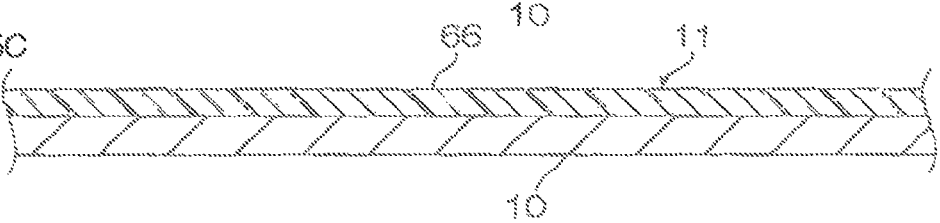

In this manner, as shown in FIGS. 15A to 15B, the base insulating layer 11 is formed on the upper surface of the supporting board 10 in a predetermined pattern. To be specific, of the base film 41, the portions thereof that are disposed at the lower side of the light fully transmitting portions 44 are formed as fully thick portions 66 that are relatively thick and of the base film 41, the portions thereof that are disposed at the lower side of the light semi-transmitting portions 45 are formed as semi-thick portions 67 that are relatively thin. Of the semi-thick portions 67, the portions thereof corresponding to the exposed opening portions 61 in the base insulating layer 11, to be more specific, the portions thereof that, when projected in the thickness direction, correspond to each of the central portions of the plurality of external terminals 32 are one example of a third portion.

Figure 16A:
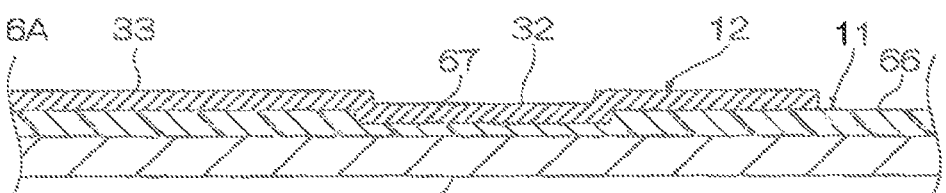
FIGS. 16A to 16C show process drawings for illustrating a method for producing a second embodiment of a suspension board with circuit and show the steps of forming a conductive pattern.
Figure 16B:
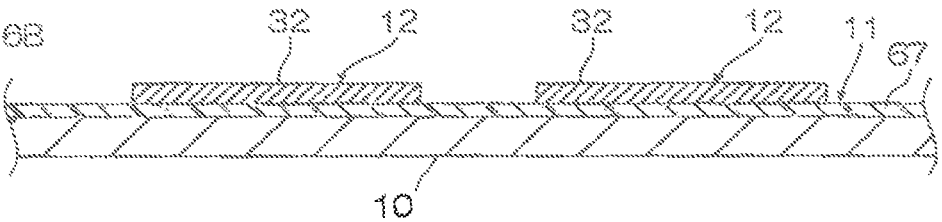
Figure 16C:
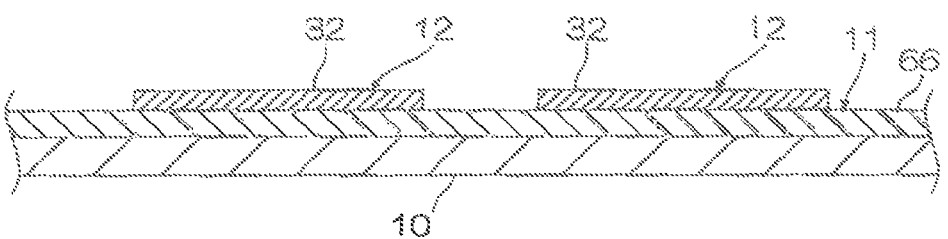

Thereafter as shown in FIGS. 16A to 16C, the conductive pattern 12 is formed on the upper surface of the base insulating layer 11.

Figure 17A:
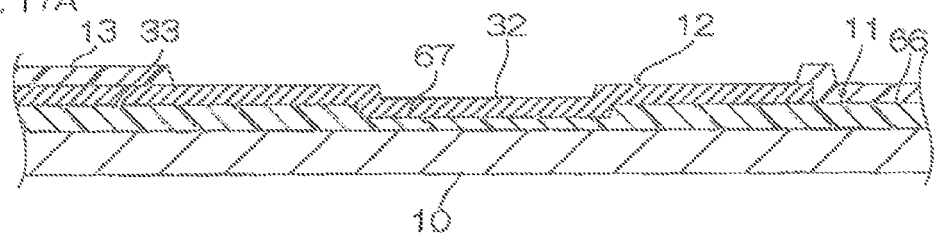
FIGS. 17A to 17C show process drawings for illustrating a method for producing a second embodiment of a suspension board with circuit and show the steps of forming a cover insulating Layer.
Figure 17B:
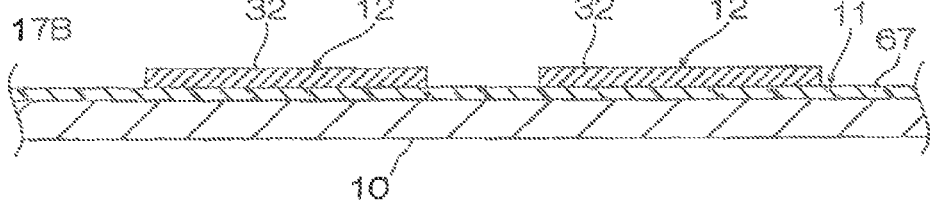
Figure 17C:
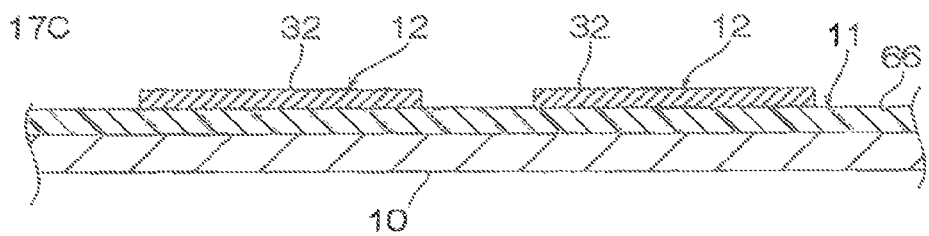

As shown in FIGS. 17A to 17C, to be specific, as shown in FIG. 17A, the cover insulating layer 13 is formed on the upper surface of the base insulating layer 11.

Then, each of the plurality of external terminals 32 is exposed from above.

Figure 18A:
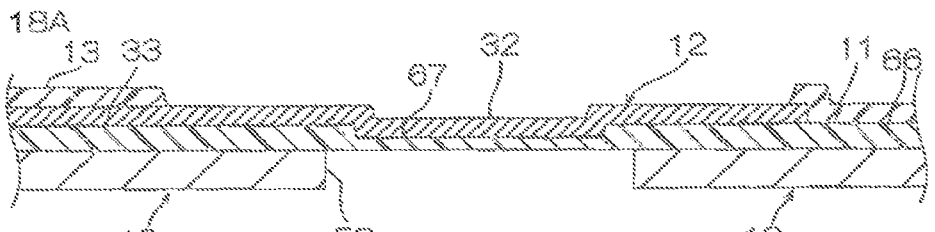
FIGS. 18A to 18C show process drawings for illustrating a method for producing a second embodiment of a suspension board with circuit and show the steps of forming first support opening portions and third support opening portions.
Figure 18B:
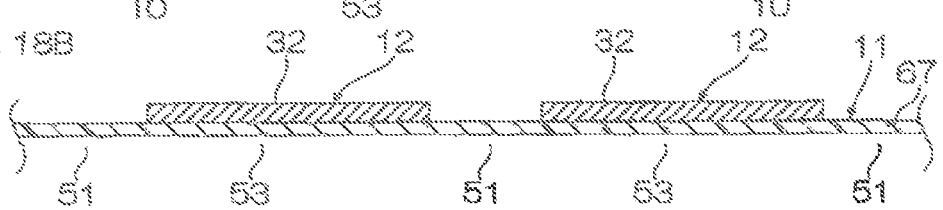
Figure 18C:
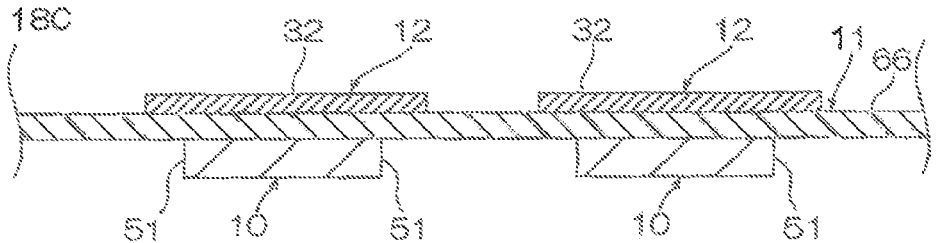

Next, as shown in FIGS. 18A to 18C, to be specific, as shown in FIG. 18C, the supporting board 10 is partially removed and the plurality of first support opening portions 51 are formed in the supporting board 10. Simultaneously, as shown in FIG. 18A, a plurality of third support opening portions 53 are formed therein. As shown in FIG. 18B, the plurality of third support opening portions 53 are disposed between the plurality of first support opening portions 51 in the lengthwise direction and are communicated with the plurality of first support opening portions 51. Each of the plurality of third support opening portions 53 is, when projected in the thickness direction, overlapped with each of the plurality of external terminals 32.

Thereafter, the base insulating layer 11 that is exposed via each of the plurality of first support opening portions 51 and each of the plurality of third support opening portions 53 is etched.

Figure 19A:
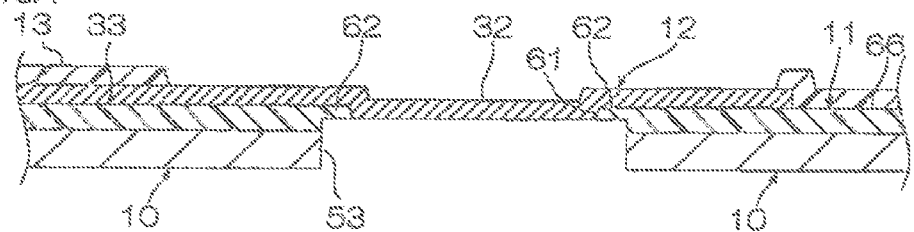
FIGS. 19A to 19C show process drawings for illustrating a method for producing a second embodiment of a suspension board with circuit and show the steps of etching a base insulating layer.
Figure 19B:
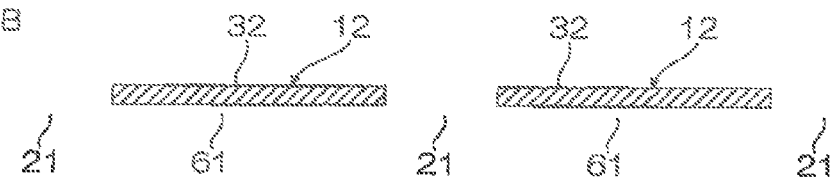
Figure 19C:
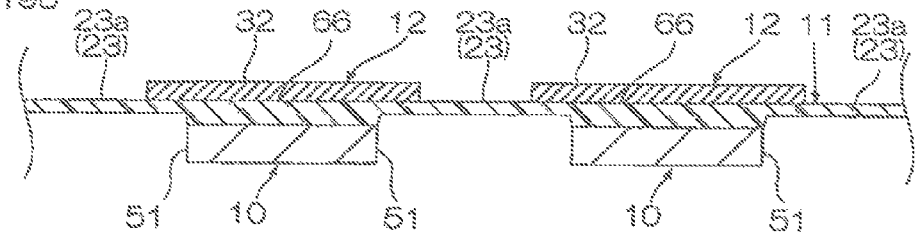

In this manner, as shown in FIGS. 19A to 19C, in the base insulating layer 11, the semi-thick portions 67 are removed to form the plurality of base opening portions 21 and the plurality of exposed opening portions 61. As shown in FIG. 19A, the fully thick portions 66 that are, when projected in the thickness direction, overlapped with each of the outer side end portions in the widthwise direction of the plurality of third support opening portions 53 and after etching are formed as the plurality of opening end portions 62.

Figure 20A:
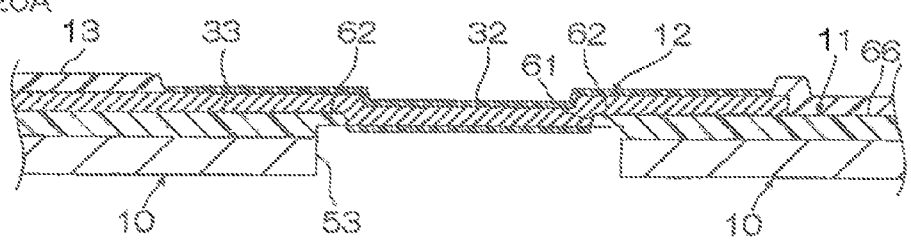
FIGS. 20A to 20C show process drawings for illustrating a method for producing a second embodiment of a suspension board with circuit and show the steps of forming a plating layer.
Figure 20B:
Figure 20C:
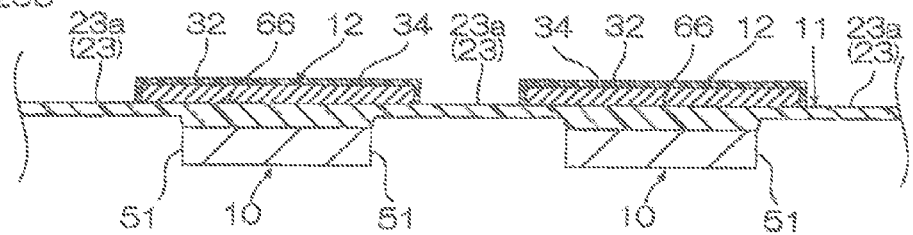

As shown in FIGS. 20A to 20C, the plating layers 34 are formed in the external terminals 32.

To form the plating layer 34, electrolytic plating is used. To be specific, the external terminals 32 are electrically conducted via a plating lead wire that is not shown and the plating layers 34 are formed on the surfaces of the external terminals 32.

Figure 21C:
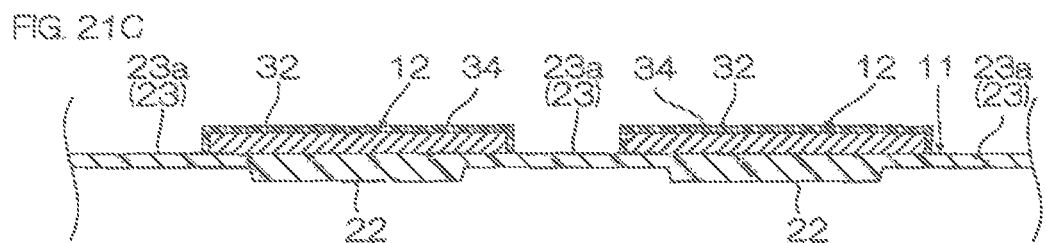

Next, as shown in FIGS. 21A to 21C, to be specific, as shown in FIGS. 21A and 21C, the supporting board 10 is partially removed and the plurality of second support opening portions 52 are formed in the supporting board 10. Then, in the base insulating layer 11, the fully thick portions 66 that are, when projected in the thickness direction, overlapped with the plurality of second support opening portions 52 are formed as the plurality of thick portions 22.

As described above, the production of the suspension board with circuit I is completed.

(3) Function and Effect of Second Embodiment

According to the second embodiment of the suspension board with circuit 1 and the method for producing the second embodiment of the suspension board with circuit 1, as shown in FIG. 21A, the upper and lower surfaces of each of the plurality of external terminals 32, excluding a portion that is overlapped with each of the plurality of thick portions 22 are exposed when projected in the thickness direction.

Thus, both sides of the upper side and the lower side of the plurality of external terminals 32 can be electrically connected.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

What is claimed is:

1. A suspension board with circuit comprising:
    a metal supporting board having a support opening portion passing through in a thickness direction,
    a base in layer disposed at one side in the thickness direction of the metal supporting board, and
    a conductive layer disposed at one side in the thickness direction of the base insulating layer and including a plurality of terminal portions, when projected in the thickness direction, overlapped with the support opening portion and disposed at spaced intervals to each other, wherein
    the base insulating layer includes
    a plurality of base opening portions that pass through in the thickness direction and are when projected in the thickness direction, disposed between the plurality of terminal portions in an arrangement direction of the plurality of terminal portions, a plurality of thick portions that are, when projected in the thickness direction, overlapped with each of end portions of the plurality of terminal portions in a direction orthogonal to both directions of the thickness direction and the arrangement direction, and a plurality of thin portions that are disposed along edge portions of the plurality of base opening portions between the plurality of thick portions and are thinner than the plurality of thick portions.

2. The suspension board with circuit according to claim 1, wherein the metal supporting board includes a terminal connecting portion that is disposed at the inside of the support opening portion so as to be separated from an edge portion of the support opening portion and is, when projected in the thickness direction, overlapped with each of the plurality of terminal portions;

the base insulating layer includes an insulating portion that is disposed between the terminal, connecting portion and the terminal portion in the thickness direction and a connecting opening portion that passes through the insulating portion in the thickness direction; and the terminal connecting portion is electrically connected to the terminal portion via the connecting opening portion.

3. The suspension board with circuit according to claim 1, wherein both sides in the thickness direction of each of the plurality of terminal portions, excluding a portion overlapped with the thick portion, are exposed, when projected in the thickness direction.

4. A method for producing a suspension board with circuit comprising the steps of:

preparing a metal supporting board;

forming a base insulating layer including a plurality of first portions disposed at spaced intervals to each other and having a thin thickness and a second portion disposed so as to surround the plurality of first portions and having a thicker thickness than the plurality of first portions at one side in a thickness direction of the metal supporting board;

forming a conductive layer including a plurality of terminal portions, when projected in the thickness direction, overlapped with the second portion between the plurality of first portions in an arrangement direction of the plurality of first portions at one side in the thickness direction of the base insulating layer;

by etching the metal supporting board, forming a plurality of first support opening portions passing through in the thickness direction and disposed when projected in the thickness direction, so as to include each of the plurality of first portions;

by etching the base insulating layer via the plurality of first support opening portions, removing the plurality of first portions to form a plurality of base opening portions passing through in the thickness direction and as a plurality of thin portions, forming a second portion exposed from the plurality of first support opening portions and, when projected in the thickness direction, being continuous to circumferential edge portions of the plurality of base opening portions; and after forming the plurality of thin portions, by etching the metal supporting board, forming, in the metal supporting board, a plurality of second support opening portions passing through in the thickness direction and, when projected in the thickness direction, overlapped with each of end portions of the plurality of terminal portions in a direction, orthogonal to at least both directions of the thickness direction and the arrangement direction and as a plurality of thick portions, forming, in the base insulating layer, a second portion, when projected in the thickness direction, overlapped with the plurality of second support opening portions.

5. The method for producing a suspension board with circuit according to claim 4, wherein the step of forming the base insulating layer includes a step of forming a connecting opening portion that passes through in the thickness direction and is disposed in the second portion between the plurality of first portions in the arrangement direction;

the step of forming the conductive layer includes a step of electrically connecting the metal supporting board to the terminal portion via the connecting opening portion; and the step of forming the plurality of second support opening portions by etching the metal supporting board includes a step of forming a plurality of second support opening portions so as to leave a portion that is, when projected in the thickness direction, overlapped with each of the central portions of the plurality of terminal portions in the metal supporting board and forming the portion that is overlapped with each of the central portions of the plurality of terminal portions as a terminal connecting portion.

6. The method for producing a suspension board with circuit according to claim 4, wherein the step of forming the base insulating layer includes a step of forming a plurality of third portions that are disposed between the plurality of first portions in the arrangement direction and have the same thickness as that of the plurality of first portions;

the step of forming the plurality of first support opening portions by etching the metal supporting board further includes a step of forming, in the metal supporting board, a plurality of third support opening portions that pass through in the thickness direction and are disposed, when projected in the thickness direction, so as to be overlapped, with the plurality of third portions; and the step of etching the base insulating layer includes a step of removing the third portion that is exposed from the plurality of third support opening portions and is, when projected in the thickness direction, overlapped with the plurality of third support opening portions.

\* \* \* \* \*